United States Patent
Nakanishi et al.

(10) Patent No.: US 11,933,997 B2
(45) Date of Patent: Mar. 19, 2024

(54) HEAT-RAY-TRANSMISSION-CONTROLLABLE, LIGHT-TRANSMISSIVE BASE MATERIAL AND LIGHT-TRANSMISSIVE BASE MATERIAL UNIT

(71) Applicant: NITTO DENKO CORPORATION, Ibaraki (JP)

(72) Inventors: Yosuke Nakanishi, Ibaraki (JP); Eri Ueda, Ibaraki (JP); Hironobu Machinaga, Ibaraki (JP); Yutaka Ohmori, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 503 days.

(21) Appl. No.: 16/497,149

(22) PCT Filed: Mar. 26, 2018

(86) PCT No.: PCT/JP2018/012216
§ 371 (c)(1),
(2) Date: Sep. 24, 2019

(87) PCT Pub. No.: WO2018/181219
PCT Pub. Date: Oct. 4, 2018

(65) Prior Publication Data
US 2020/0379153 A1 Dec. 3, 2020

(30) Foreign Application Priority Data

Mar. 31, 2017 (JP) .................................. 2017-073026
Mar. 16, 2018 (JP) .................................. 2018-049517

(51) Int. Cl.
G02B 5/28 (2006.01)
B32B 7/12 (2006.01)
(Continued)

(52) U.S. Cl.
CPC ................. *G02B 5/282* (2013.01); *B32B 7/12* (2013.01); *C03C 17/245* (2013.01); *E06B 9/24* (2013.01);
(Continued)

(58) Field of Classification Search
CPC ......... G02B 5/282; B32B 7/12; C03C 17/245; C03C 2217/231; C03C 2217/948; C03C 2218/156; E06B 9/24; E06B 2009/2417
See application file for complete search history.

(56) References Cited

U.S. PATENT DOCUMENTS 8,637,169 B2  1/2014  Van Nutt et al.
10,007,037 B2  6/2018  Fujisawa et al.
(Continued)

FOREIGN PATENT DOCUMENTS

CN  102985898 A  3/2013
CN  103966560 A  8/2014
(Continued)

OTHER PUBLICATIONS

Office Action issued for corresponding Chinese Patent Application No. 201880020695.6 dated Jul. 28, 2021, along with an English machine translation.
(Continued)

*Primary Examiner* — Alicia J Weydemeyer
*Assistant Examiner* — Laura B Figg
(74) *Attorney, Agent, or Firm* — HAUPTMAN HAM, LLP

(57) ABSTRACT

A heat-ray-transmission-controllable, light-transmissive base material is provided that includes a light-transmissive insolation-cutting unit configured to control transmission of light in at least a part of wavelength regions among wavelength regions of visible light and near-infrared light; and a transparent conductive oxide layer disposed over the light-
(Continued)

transmissive insolation-cutting unit, containing a transparent conductive oxide.

8 Claims, 2 Drawing Sheets

(51) Int. Cl.
    *C03C 17/245* (2006.01)
    *E06B 9/24* (2006.01)

(52) U.S. Cl.
    CPC .. *C03C 2217/231* (2013.01); *C03C 2217/948* (2013.01); *C03C 2218/156* (2013.01); *E06B 2009/2417* (2013.01)

(56) References Cited

U.S. PATENT DOCUMENTS

| | | | |
|---|---|---|---|
| 2006/0062933 | A1 | 3/2006 | Schunk et al. |
| 2013/0105069 | A1 | 5/2013 | Van Nutt et al. |
| 2013/0113757 | A1 | 5/2013 | Tanaka et al. |
| 2013/0260139 | A1 | 10/2013 | Kamada et al. |
| 2014/0101919 | A1 | 4/2014 | Van Nutt et al. |
| 2016/0047958 | A1* | 2/2016 | Fujisawa ............... B32B 9/00 359/360 |
| 2016/0145736 | A1 | 5/2016 | Watanabe et al. |
| 2017/0052297 | A1 | 2/2017 | Zhang et al. |
| 2017/0075044 | A1 | 3/2017 | Watanabe et al. |
| 2020/0379153 | A1 | 12/2020 | Nakanishi et al. |

FOREIGN PATENT DOCUMENTS

| | | |
|---|---|---|
| CN | 104097362 A | 10/2014 |
| CN | 106009813 A | 10/2016 |
| EP | 2 985 145 A1 | 2/2016 |
| EP | 3438733 A1 | 2/2019 |
| JP | 2013-521160 A | 6/2013 |
| JP | 2014-56205 A | 3/2014 |
| JP | 2016-79051 A | 5/2016 |
| KR | 10-2016-0042153 A | 4/2016 |
| KR | 10-1609525 B1 | 4/2016 |
| TW | 201539050 A | 10/2015 |
| TW | 201630717 A | 9/2016 |
| WO | 2012/070477 A1 | 5/2012 |
| WO | 2013/032542 A1 | 3/2013 |
| WO | 2014/167964 A1 | 10/2014 |
| WO | 2015/133370 A1 | 9/2015 |
| WO | 2016/060082 A1 | 4/2016 |
| WO | 2017/047281 A1 | 3/2017 |
| WO | 2017/170760 A1 | 10/2017 |

OTHER PUBLICATIONS

Office Action issued for corresponding Japanese Patent Application No. 2018-049517 dated Aug. 31, 2021, along with an English machine translation.
Office Action issued for corresponding Chinese Patent Application No. 201880020695.6 dated Mar. 23, 2021, along with an English translation.
Extended European Search Report issued for corresponding European Patent Application No. 18777180.3 dated Dec. 2, 2020.
Office action issued for corresponding Taiwanese Patent Application No. 107110903 dated Jun. 15, 2021, along with an English translation.
Office Action dated Oct. 19, 2021, for corresponding Chinese Patent Application No. 201880020695.6, along with an English translation.
Office Action dated Feb. 15, 2022 for corresponding Japanese Patent Application No. 2018-049517, along with an English machine translation.
International Search Report for corresponding international application PCT/JP2018/012216 dated May 29, 2018, citing the above references.
Office Action dated Apr. 13, 2022, for corresponding Chinese patent application No. 201880020695.6, along with an English translation.
International Search Report dated Jun. 5, 2018, for corresponding International Patent Application No. PCT/JP2018/012217, along with an English translation.
Extended European search report dated Dec. 14, 2020, for corresponding European Patent Application No. 18776403.0.
Office Action dated Mar. 23, 2021, for corresponding Chinese patent application No. 201880020827.5, along with English machine translation.
Office Action dated Jun. 15, 2021, for corresponding Japanese Patent Application No. 2018-049516, along with an English machine translation.
Office Action Jun. 11, 2021, for corresponding Taiwanese Patent Application No. 107110904, along with an English translation.
Office Action dated Jul. 28, 2021, for corresponding Chinese patent application No. 201880020827.5, along with an English translation.
Office Action dated Oct. 19, 2021, for corresponding Chinese patent application No. 201880020827.5, along with an English translation.
Office Action dated Feb. 1, 2022, for corresponding Japanese Patent Application No. 2018-049516, along with an English machine translation.
Decision of Rejection dated Apr. 6, 2022, for corresponding Chinese patent application No. 201880020827.5, along with an English translation.
Office Action dated May 12, 2022, for related U.S. Appl. No. 16/497,522.
Office Action dated Sep. 6, 2022, for related U.S. Appl. No. 16/497,522 (10 pages).
Office Action dated Aug. 30, 2022 for corresponding Japanese Patent Application No. 2018-049517, along with an English translation (7 pages).
Office Action dated Dec. 13, 2022, for corresponding Japanese Patent Application No. 2018-49516, along with an English translation (8 pages).
Office Action dated Jan. 5, 2023, for corresponding Korean Patent Application No. 10-2019-7027827, along with an English machine translation (12 pages).
Office Action dated Jan. 5, 2023, for corresponding Korean Patent Application No. 10-2019-7027859, along with an English machine translation (11 pages).
Official Action dated Jan. 31, 2023, for corresponding European Patent Application No. 18 777 180.3 (6 pages).
Official Action dated Feb. 15, 2023, for corresponding European Patent Application No. 18 776 403.0 (6 pages).
Office Action dated Feb. 28, 2023, for corresponding Japanese Patent Application No. 2018-049517, along with an English translation (5 pages).
Wen-Fa Wu et al., "Effect of annealing on electrical and optical properties of RF magnetron sputtered indium tin oxide films", Applied Surface Science, Aug. 1, 1993, vol. 68, No. 4, pp. 497-504, cited in NPL No. 1.
Kham M Niang et al., "Zinc tin oxide thin film transistors produced by a high rate reactive sputtering: Effect of tin composition and annealing temperatures", Physica Status Solidi. A: Applications and Materials Science, Jan. 25, 2017, vol. 214, No. 2, p. 1600470 (7 pages), cited in NPL No. 1.
Hiroki Nagai et al., "Heat Treatment in Molecular Precursor Method for Fabricating Metal Oxide Thin Films", In: "Heat Treatment— Conventional and Novel Applications", Sep. 26, 2012, (26 pages), cited in NPL No. 2.
Office Action dated Apr. 14, 2023 for co-pending U.S. Appl. No. 16/497,522 (10 pages).
Hiraki Nagai et al., "Heat Treatment in Molecular Precursor Method for Fabricating Metal Oxide Thin Films", In: "Heat Treatment— Conventional and Novel Applications", Sep. 26, 2012, (26 pages), cited in NPL No. 2.
Office Action dated Jun. 27, 2023, for corresponding Japanese Patent Application No. 2018-49516, along with an English translation (21 pages).
Office Action dated Jul. 19, 2023, for corresponding Korean Patent Application No. 10-2019-7027859, along with an English translation (8 pages).

(56) References Cited

OTHER PUBLICATIONS

Notice of Allowance dated Jul. 21, 2023, for corresponding Korean Patent Application No. 10-2019-7027827, along with an English translation (4 pages).
Office Action dated Oct. 31, 2023 for co-pending U.S. Appl. No. 16/497,522 (11 pages).
Office Action dated Nov. 21, 2023 for corresponding Korean Patent Application No. 10-2019-7027859, along with an English translation (7 pages).

* cited by examiner

HEAT-RAY-TRANSMISSION-CONTROLLABLE, LIGHT-TRANSMISSIVE BASE MATERIAL AND LIGHT-TRANSMISSIVE BASE MATERIAL UNIT

CROSS REFERENCE TO RELATED APPLICATION

This application claims the priority of Japanese Patent Application No. 2017-073026, filed on Mar. 31, 2017 and Japanese Patent Application No. 2018-049517, filed on Mar. 16, 2018, in the JPO (Japanese Patent Office). Further, this application is the National Phase Application of International Application No. PCT/JP2018/012216, filed on Mar. 26, 2018, which designates the United States and was published in Japan. Both of the priority documents are hereby incorporated by reference in their entireties.

TECHNICAL FIELD

The present invention relates to a heat-ray-transmission-controllable, light-transmissive base material and a light-transmissive base material unit.

BACKGROUND ART

Conventionally, a heat-ray-transmission-controllable, light-transmissive base material has been known that has a layer provided with a function of reflecting heat rays over a light-transmissive base material such as glass or resin.

As such heat-ray-transmission-controllable, light-transmissive base materials, base materials have been studied conventionally that reflect part of visible light and near-infrared rays of sunlight or the like, to provide heat-shielding capability that controls, for example, rise in temperature in the interior of a room or vehicle. Also, studies have been conducted on heat-ray-transmission-controllable, light-transmissive base materials that have reduced emissivity so as to provide heat-insulating capability.

For example, Patent Document 1 discloses a low-radiation transparent composite material film that includes: a transparent film base material; a lower layer formed of a wear-resistant hard-coat material having an affinity with the transparent film base material; and at least one infrared-reflective layer, in which the composite film has emissivity less than approximately 0.30, and the lower layer is disposed between the transparent film base material and the infrared-reflective layer. In addition, an example is disclosed in which a silver-gold (Ag—Au) alloy is used as a core layer of the infrared-reflective layer.

RELATED ART DOCUMENTS

Patent Document

Patent Document 1: Published Japanese Translation of PCT International Application No. 2013-521160

SUMMARY OF THE INVENTION

Problem to be Solved by the Invention

The silver-gold alloy mentioned as the material of the infrared-reflective layer of the low-radiation transparent composite material film disclosed in Patent Document 1 has an effect of reducing the emissivity and provides heat-insulating capability.

However, in addition to heat-insulating capability, silver and silver alloys also provide heat-shielding capability realized by reflecting a part of visible light and near-infrared rays of sunlight or the like. For this reason, according to the low-radiation transparent composite material film disclosed in Patent Document 1, for example, when the thickness of the core layer of the infrared-reflective layer is increased in order to increase the heat-insulating capability, the heat-shielding capability is also increased simultaneously.

Meanwhile, a heat-ray-transmission-controllable, light-transmissive base material is required to have characteristics in accordance with the place of installation. For example, in a cold area, characteristics such as high heat-insulating capability and low heat-shielding capability are required.

However, according to the low-radiation transparent composite material film disclosed in Patent Document 1, as described above, it is not possible to independently control the heat-insulating capability and the heat-shielding capability, and hence, characteristics such as high heat-insulating capability and low heat-shielding capability cannot be realized.

Thereupon, in view of the above problem of the conventional technology, it is an object of an aspect of the present invention to provide a heat-ray-transmission-controllable, light-transmissive base material that is capable of controlling the heat-insulating capability and the heat-shielding capability independently.

Means for Solving the Problem

In order to solve the above problem, in one aspect of the present invention, a heat-ray-transmission-controllable, light-transmissive base material is provided that includes a light-transmissive insolation-cutting unit configured to control transmission of light in at least a part of wavelength regions among wavelength regions of visible light and near-infrared light; and a transparent conductive oxide layer disposed over the light-transmissive insolation-cutting unit, containing a transparent conductive oxide.

Advantageous Effect of the Present Invention

According to one aspect of the present invention, it is possible to provide a heat-ray-transmission-controllable, light-transmissive base material that is capable of controlling the heat-insulating capability and the heat-shielding capability independently.

EMBODIMENTS FOR CARRYING OUT THE INVENTION

In the following, an embodiment (referred to as "the present embodiment", below) of the present disclosure will be described in detail; note that the present embodiment is not limited by such details.

[Heat-Ray-Transmission-Controllable, Light-Transmissive Base Material]

One configuration example of a heat-ray-transmission-controllable, light-transmissive base material of the present embodiment will be described below.

A heat-ray-transmission-controllable, light-transmissive base material of the present embodiment includes a light-transmissive insolation-cutting unit configured to control transmission of light in at least a part of wavelength regions among wavelength regions of visible light and near-infrared light; and a transparent conductive oxide layer disposed over the light-transmissive insolation-cutting unit, containing a transparent conductive oxide.

The inventors of the present invention conducted intensive investigations on heat-ray-transmission-controllable, light-transmissive base materials that are capable of independently controlling heat-insulating capability and heat-shielding capability.

As a result, first, a finding was obtained that providing a transparent conductive oxide layer containing a transparent conductive oxide enables to independently control heat-insulating capability. According to the investigations of the inventors of the present invention, it is possible to reflect far-infrared rays by using carriers held in the transparent conductive oxide contained in the transparent conductive oxide layer. For this reason, heat-insulating capability can be controlled by providing a transparent conductive oxide layer as described above and, for example, adjusting the thickness and the like.

Further, by a light-transmissive insolation-cutting unit capable of controlling transmission of light in at least a part of wavelength regions among wavelength regions of visible light and near-infrared light, it is possible, for example, to reflect or absorb light in at least the part of wavelength regions among the wavelength regions of visible light and near-infrared light. Thus, the inventors discovered that heat-shielding capability could be controlled independently by selecting and adjusting the configuration and the like of the light-transmissive insolation-cutting unit.

Thereupon, by using a heat-ray-transmission-controllable, light-transmissive base material including a transparent conductive oxide layer capable of controlling heat-insulating capability and a light-transmissive insolation-cutting unit capable of controlling heat-shielding capability to form a heat-ray-transmission-controllable, light-transmissive base material, and by selecting and adjusting the configuration of the transparent conductive oxide layer and the light-transmissive insolation-cutting unit, the inventors have found that the heat-insulating capability and heat-shielding could be controlled independently, and thus, completed the present invention.

Figure 1:
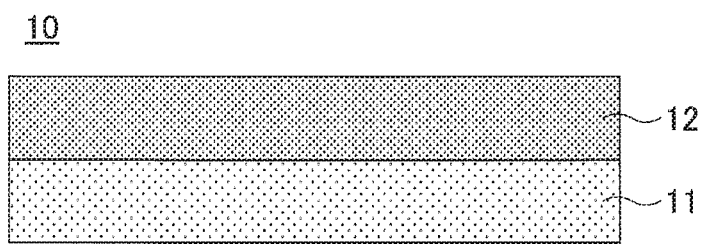
FIG. 1 is a cross-sectional view of a heat-ray-transmission-controllable, light-transmissive base material in one configuration example according to an embodiment of the present invention.

Here, a configuration example of a heat-ray-transmission-controllable, light-transmissive base material of the present embodiment is illustrated in FIG. 1. FIG. 1 schematically illustrates a cross-sectional view of a heat-ray-transmission-controllable, light-transmissive base material of the present embodiment on a plane parallel to the laminating direction of a light-transmissive insolation-cutting unit and a transparent conductive oxide layer.

As illustrated in FIG. 1, a heat-ray-transmission-controllable, light-transmissive base material 10 of the present embodiment may have a structure in which a transparent conductive oxide layer 12 is laminated over one surface of a light-transmissive insolation-cutting unit 11. In the following, each of the members will be described.

As compared to the case where no light-transmissive insolation-cutting unit is provided, the light-transmissive insolation-cutting unit 11 simply needs to have a heat-shielding function layer capable of controlling transmission of light in at least a part of wavelength regions among wavelength regions of visible light and near-infrared light, and its specific configuration is not limited in particular. The configuration of the light-transmissive insolation-cutting unit 11 can be selected according to the degree of heat-shielding capability required for the heat-ray-transmission-controllable, light-transmissive base material, and can be constituted with, for example, one member or two or more members.

Note that the wavelength region of visible light means a range in which, for example, the lower limit of the wavelength is greater than or equal to 360 nm and less than or equal to 400 nm, and the upper limit is greater than or equal to 760 nm and less than or equal to 830 nm. Therefore, for example, the region may cover wavelengths greater than or equal to 360 nm and less than or equal to 830 nm.

Further, the wavelength region of near-infrared light is a wavelength region adjacent to that of visible light, and is a region in which the wavelength is longer than that of visible light. For example, it means a range in which the lower limit of the wavelength is greater than or equal to 760 nm and less than or equal to 830 nm, and the upper limit is greater than or equal to 2000 nm and less than or equal to 3000 nm. Therefore, for example, the region covers wavelengths greater than or equal to 760 nm and less than or equal to 3000 nm.

For this reason, the light-transmissive insolation-cutting unit can control transmission of light in a part of a region of the wavelength region of, for example, greater than or equal to 360 nm and less than or equal to 3000 nm.

The light-transmissive insolation-cutting unit 11 will be described below.

The light-transmissive insolation-cutting unit may include, as a heat-shielding function layer, one or more layers selected from among, for example, a colored light-transmissive layer, a layer containing heat-ray shielding particles, a near-infrared light reflective film, and a visible-light-transmission controlling layer.

As a colored light-transmissive layer, a colored glass layer or a colored resin layer may be listed. The specific configuration is not limited in particular, and it is possible to select a color to be colored and the depth of the color, depending on the required visible light transmittance, color tone, and the like. Note that a colored light-transmissive layer can control transmission of part of visible light depending on the degree of coloring and the like, and hence, can also function as a visible-light-transmission controlling layer.

As a layer containing heat-ray-shielding particles, for example, a layer containing heat-ray-shielding particles capable of selectively absorbing light having a wavelength of greater than or equal to 800 nm and less than or equal to 1200 nm may be considered. As such heat-ray-shielding particles, particles containing one or more species of substances selected from among $Cs_{0.33}WO_3$, $LaB_6$, and the like may be listed. A layer containing heat-ray-shielding particles is favorably a layer in which the heat-ray-shielding particles are dispersed in a transparent binder capable of transmitting visible light. As such binders, an inorganic binder and an organic binder may be listed; and as inorganic binders, a binder obtained by hydrolyzing a metal alkoxide and glass may be listed. As organic binders, one or more resins selected from among polyethylene terephthalate (PET), polyethylene naphthalate (PEN), polyetheretherketone (PEEK), polycarbonate (PC), and the like may be listed.

As a near-infrared reflective film, for example, a multilayer film in which high-refractive-index layers and low-refractive-index layers are alternately laminated; a multilayer film in which a metal layer is disposed between metal oxide layers; a multilayer film in which a metal oxide layer or a transparent resin layer is disposed between metal layers; a monolayer of a metal or a metal alloy; or the like may be listed.

In the case of the near-infrared reflective film being a multilayer film in which high-refractive-index layers and low-refractive-index layers are alternately laminated, difference in the refractive indices between the high refractive index layer and the low refractive index layer can be mainly used to reflect near-infrared rays and control the transmission of near-infrared rays, where the specific refractive index of each layer is not limited in particular. For example, it is favorable that the high-refractive-index layer has a refractive index of greater than or equal to 2.0 and less than or equal to 2.7, and it is favorable that the low-refractive-index layer has a refractive index of greater than or equal to 1.3 and less than or equal to 1.8. Note that the refractive index described above means a refractive index with respect to light having a wavelength of 550 nm.

The number of layers of high-refractive-index layers and low-refractive-index layers included in a near-infrared reflective film is not limited in particular; in the case of a single high-refractive-index layer and a single low-refractive-index layer being taken as a unit refractive-index layer, it is favorable to include five units or more of such unit refractive-index layers, and more favorable to include eight units or more.

The materials constituting a high-refractive-index layer and a low-refractive-index layer are not limited in particular, and can be discretionarily selected depending on the refractive index of each material and the like. A high-refractive-index layer may contain, for example, one or more species selected from among $TiO_2$, $Nb_2O_5$, and $Ta_2O_5$. Also, a low-refractive-index layer may contain, for example, one or more species selected from among $SiO_2$, $MgF_2$, $Al_2O_3$, and ZrO2. Also, a layer formed of resin whose refractive index is adjusted may also be included as a high-refractive-index layer or a low-refractive-index layer.

As described above, a near-infrared reflective film may be a film having a structure in which, for example, a first metal oxide layer, a metal layer, and a second metal oxide layer are laminated in this order.

In this case, the metal layer plays a central role in reflecting near-infrared rays. From the viewpoint of increasing the visible light transmittance and near-infrared reflectance, as the metal layer, a layer containing one or more metals selected from among silver, gold, copper, aluminum, and the like may be listed. In particular, a silver layer or a silver alloy layer containing silver as the main component is used favorably. Since silver has a high free-electron density, it is possible to realize high reflectance of near-infrared rays, and to exhibit a high heat-shielding effect.

In the case where the metal layer contains silver, the content of silver in the metal layer is favorably greater than or equal to 90 mass %, more favorably greater than or equal to 93 mass %, even more favorably greater than or equal to 95 mass %, and particularly favorably greater than or equal to 96 mass %. Since the metal layer may also be formed of silver, the upper limit value of the content of silver in the metal layer can be less than or equal to 100 mass %. Increasing the content of silver in the metal layer enables to increase the visible light transmittance and the wavelength selectivity of reflected light for the near-infrared reflective film. For this reason, the visible light transmittance of the heat-ray-transmission-controllable, light-transmissive base material can be increased.

The metal layer may be a silver alloy layer that also contains metal other than silver. A silver alloy may be used, for example, for increasing the durability of the metal layer. As metals to be added to silver for the purpose of increasing the durability of the metal layer, one or more species selected from among palladium (Pd), gold (Au), copper (Cu), bismuth (Bi), germanium (Ge), gallium (Ga), and the like are favorable. Among these, from the viewpoint of imparting high durability to silver, Pd is used most favorably as a metal other than silver.

When the amount of metal other than silver such as Pd is increased, the durability of the metal layer tends to be improved. In the case where a metal layer contains metal other than silver such as Pd, the content is favorably greater than or equal to 0.3 mass %, more favorably greater than or equal to 0.5 mass %, even more favorably greater than or equal to 1 mass %, and particularly favorably greater than or equal to 2 mass %. On the other hand, if the added amount of metal other than silver, such as Pd, increases and the content of silver decreases, the visible light transmittance of the near-infrared reflective film tends to decrease. Therefore, the content of a metal other than silver in the metal layer is favorably less than or equal to 10 mass %, more favorably less than or equal to 7 mass %, even more favorably less than or equal to 5 mass %, and particularly favorably less than or equal to 4 mass %.

The first metal oxide layer and the second metal oxide layer (collectively referred to as "metal oxide layers", below) are provided for the purpose of controlling the reflected amount of visible light at the interface with the metal layer so as to achieve both a high visible light transmittance and a high near-infrared light reflectance. The metal oxide layers may also function as protective layers for preventing deterioration of the metal layer. From the viewpoint of increasing the reflectivity and the wavelength selectivity of the near-infrared reflective film, the refractive index of the metal oxide layer with respect to visible light is favorably greater than or equal to 1.5, more favorably greater than or equal to 1.6, and even more favorably greater than or equal to 1.7.

As materials having the refractive index described above, a metal oxide selected from among a group of metals titanium (Ti), zirconium (Zr), hafnium (Hf), niobium (Nb), zinc (Zn), aluminum (Al), gallium (Ga), indium (In), and the like; or a composite oxide of two or more species of metals selected from among the above group of metals, may be listed.

The thicknesses of a metal layer and a metal oxide layer described above are appropriately set in consideration of the refractive index of the materials and the like so that the near-infrared reflective film transmits visible light and selectively reflects near-infrared light.

The thickness of a metal layer may be set to, for example, greater than or equal to 3 nm and less than or equal to 50 nm. The thickness of each metal oxide layer may be set to, for example, greater than or equal to 3 nm and less than or equal to 80 nm. Although the film-forming method of a metal layer and a metal oxide layer is not limited in particular, the film is favorably formed by dry processes, such as sputtering, vacuum evaporation, CVD, electron beam evaporation, and the like.

As described above, a near-infrared reflective film may be a film having a structure in which, for example, a first metal layer, a metal oxide layer or transparent resin layer, and a second metal layer are laminated in this order.

The first metal layer and the second metal layer can function as a half-transmissive mirror layer that causes interference between light reflected on the first metal layer and light reflected on the second metal layer to attenuate visible light reflection within a specific wavelength region.

As the materials of the first metal layer and the second metal layer, the same materials as used in a metal layer in a multilayer film in which a first metal oxide layer, the metal layer, and a second metal oxide layer are laminated as described above; namely, one or more species of metals selected from among silver, gold, copper, aluminum, and the like, may be listed. In particular, silver or a silver alloy can be suitably used. Near-infrared rays can be reflected by the first metal layer and the second metal layer.

Also for the metal oxide layer or the transparent resin layer, the same materials as used in a metal layer in a multilayer film in which a first metal oxide layer, the metal layer, and a second metal oxide layer are laminated as described above; or various transparent resins that transmit visible light may be used.

Although the thickness of each layer is not limited in particular, in order to attenuate visible light reflection by causing interference between light rays reflected on the first metal layer and on the second metal layer, it is favorable to select the thickness of each layer in accordance with the wavelength of targeted visible light.

Note that another structure may be adopted that includes a first metal layer, a metal oxide layer or a transparent resin layer, and a second metal layer as a basic unit; and further includes a metal oxide layer and/or a metal layer in the same laminating order.

Also, as a near-infrared ray reflective film, a single layer film of a metal or metal alloy that can selectively reflect near-infrared rays may also be used. As such metals or metal alloys, one or more metals or metal alloys selected from among silver, gold, copper, aluminum, and the like may be listed.

A light-transmissive insolation-cutting unit may also include, as a heat-shielding function layer, for example, a visible-light-transmission controlling layer or the like that controls transmission of part of visible light. Depending on the wavelength region, visible light may cause a rise in temperature in a room or the like. Therefore, a visible-light-transmission controlling layer can also function as a heat-shielding function layer. As a visible-light-transmission controlling layer, a metal film of a Ni—Cr alloy or the like, a substrate colored with a pigment, or the like may be listed. In the case of using a visible-light-transmission controlling layer, it is favorable to select the material and configuration so as not to impair, for example, the visible light transmission required for a light-transmissive insolation-cutting unit.

A light-transmissive insolation-cutting unit may also include optional members other than a heat-shielding function layer described above. Also, the following optional members may also serve as a heat-insulation function layer as will be described later.

A light-transmissive insolation-cutting unit may also include a light-transmissive base material.

As a light-transmissive base material, various transparent base materials capable of transmitting visible light can be used favorably. As such a light-transmissive base material, one having visible light transmittance greater than or equal to 10% can be used more favorably. Note that in the present description, visible light transmittance is measured in accordance with JIS A5759-2008 (films for building window glass).

As a light-transmissive base material, a glass plate, a light-transmissive resin base material, or the like can be used favorably.

In the case of using a light-transmissive resin base material as the light-transmissive base material, any material can be used favorably as long as being capable of transmitting visible light as described above. However, since heat treatment or the like may be carried out when forming layers over a light-transmissive resin base material, as the material of the light-transmissive resin base material, a resin that has heat resistance may be used favorably. As resin materials constituting a light-transmissive resin base material, one or more species selected from among, for example, polyethylene terephthalate (PET), polyethylene naphthalate (PEN), polyetheretherketone (PEEK), polycarbonate (PC), and the like may be used favorably.

A heat-ray-transmission-controllable, light-transmissive base material of the present embodiment can be used, for example, as the light-transmissive base material of a daylighting part such as a window, or being attached to the light-transmissive base material of a daylighting part such as a window. For this reason, the thickness and material can be selected for the light-transmissive base material depending on the use and the like. The light-transmissive base material may have a thickness, for example, greater than or equal to 10 μm and less than or equal to 25 mm.

For example, in the case of using a heat-ray-transmission-controllable, light-transmissive base material of the present embodiment as the light-transmissive base material of a daylighting part such as a window, it is favorable to select the thickness and material of the light-transmissive base material such that the light-transmissive base material has sufficient strength.

Alternatively, in the case of using a heat-ray-transmission-controllable, light-transmissive base material of the present embodiment by attaching to the light-transmissive base material of a daylighting part such as a window, it is favorable to select the thickness and material of the light-transmissive base material to have flexibility so as to be easily attachable to the light-transmissive base material of the window or the like, and to improve the productivity of the heat-ray-transmission-controllable, light-transmissive base material. Specifically, a light-transmissive resin base material having flexibility is suitably used. In the case of using a light-transmissive resin base material having flexibility as the light-transmissive base material, the thickness is favorably within a range approximately greater than or equal to 10 μm and less than or equal to 300 μm.

Note that the light-transmissive base material may be constituted with a single sheet of a light-transmissive base material, or may be constituted with two or more sheets of a light-transmissive base material that are bonded to each other to be combined to be used. In the case of using a combination of two or more sheets of a light-transmissive base material that are bonded to each other, it is favorable that the total thickness falls within, for example, a favorable thickness range for a single light-transmissive base material as described above.

A light-transmissive insolation-cutting unit may also include an adhesive layer.

Although the material of an adhesive layer is not limited in particular, it is favorable to use a material having high visible light transmittance. As the material of an adhesive layer, for example, an acrylic adhesive, rubber-based adhesive, silicone-based adhesive, or the like may be used. Among these, an acrylic adhesive containing an acrylic polymer as the main component is excellent in optical transparency, exhibits appropriate wettability, cohesiveness, and adhesiveness, and is excellent in weather resistance, heat resistance, and the like; therefore, it is favorable as the material of an adhesive layer.

It is favorable that an adhesive layer has high visible light transmittance and low ultraviolet transmittance. Lowering the ultraviolet light transmittance of an adhesive layer enables to control deterioration of a layer containing an organic substance, a transparent conductive oxide layer, and the like caused by ultraviolet rays in sunlight or the like. From the viewpoint of lowering the ultraviolet light transmittance of an adhesive layer, it is favorable that the adhesive layer contains an ultraviolet absorber. Note that deterioration of a transparent conductive oxide layer and the like caused by ultraviolet rays from outdoors may also be controlled by using a light-transmissive base material or the like that contains an ultraviolet absorber. It is favorable to cover an exposed surface of an adhesive layer by a release paper temporarily attached to the surface for the purpose of preventing contamination of the exposed surface until the heat-ray-transmission-controllable, light-transmissive base material is put to practical use. Thereby, contamination caused by contact with the exterior of the exposed surface of the adhesive layer can be prevented in a normal handling state.

Also, in the case where a light-transmissive insolation-cutting unit includes, for example, a light-transmissive base material and the light-transmissive base material is a rigid body such as a glass plate or an acrylic plate, the heat-ray-transmission-controllable, light-transmissive base material of the present embodiment may be fitted into a frame, such as a window frame, to provide a heat-shielding, heat-insulating window. In this case, it is favorable for the heat-ray-transmission-controllable, light-transmissive base material of the present embodiment not to have an adhesive layer.

A light-transmissive insolation-cutting unit may also include a hard-coat layer.

A hard-coat layer can support a transparent conductive oxide layer, which will be described later. For this reason, providing a hard-coat layer particularly enables to control generation of scratches or delamination on the transparent conductive oxide layer when a hand or object moves on the heat-ray-transmission-controllable, light-transmissive base material in a state of applying pressure to the surface to cause friction, and thereby, deforms the transparent conductive oxide layer. In other words, providing a hard-coat layer enables to increase the abrasion resistance of the heat-ray-transmission-controllable, light-transmissive base material of the present embodiment in particular.

If scratches or delamination are generated on the transparent conductive oxide layer, the function of the transparent conductive oxide layer may be reduced or the appearance may be impaired. However, providing a hard-coat layer enables to control generation of scratches or delamination on the transparent conductive oxide layer as described above. For this reason, reduction in the heat-insulating capability of the transparent conductive oxide layer can be controlled, and an external appearance can be maintained, which are favorable.

A hard-coat layer may be formed by using, for example, a resin, to be formed as a resin hard-coat layer. Although the material of a hard-coat layer is not limited in particular, a material having a high visible light transmittance is favorable; for example, one or more resins selected from among acrylic resins, silicone resins, urethane resins, and the like can be favorably used.

A hard-coat layer may be formed, for example, by coating a resin as a raw material on one surface of the light-transmissive base material or the like and curing the resin.

The thickness of a hard-coat layer is not limited in particular, and can be selected discretionarily depending on the material of the hard-coat layer and/or required levels of visible light transmittance, abrasion resistance, and the like. For example, the thickness of a hard-coat layer is favorably greater than or equal to 0.5 μm and less than or equal to 10 μm, and more favorably greater than or equal to 0.7 μm and less than or equal to 5 μm.

This is because setting the thickness of the hard-coat layer to be greater than or equal to 0.5 μm enables to obtain a hard-coat layer having sufficient strength, and enables to control deformation of the transparent conductive oxide layer in particular. This is also because setting the thickness of the hard-coat layer to be less than or equal to 10 μm enables to control the internal stress that is generated by contraction of the hard-coat layer.

It is also possible to provide an optional layer between a hard-coat layer and a transparent conductive oxide layer described above. For example, an underlayer such as an optical adjustment layer, a gas barrier layer, an adhesiveness improving layer, or the like can be provided between a hard-coat layer and a transparent conductive oxide layer. An optical adjustment layer enables to improve color tone and transparency; a gas barrier layer enables to improve the crystallization rate of a transparent conductive oxide; and an adhesiveness improving layer enables to improve durability such as delamination resistance between layers and cracking resistance.

Although underlayers to be configured are not limited in particular, as an adhesiveness improving layer and/or a gas barrier layer, for example, a layer containing alumina ($Al_2O_3$) may be listed. Also, as an optical adjustment layer, a layer containing zirconia ($ZrO_2$), a layer containing hollow particles, or the like may be listed.

In the case where a light-transmissive insolation-cutting unit includes one or more layers selected from among a light-transmissive layer colored as a heat-shielding function layer, a layer containing heat-ray-shielding particles, a near-infrared reflective film, and a visible-light-transmission controlling layer, these layers may also be provided separately from the light-transmissive base material, the hard-coat layer, the adhesive layer, and the like. Also, the light-transmissive base material, the hard-coat layer, the adhesive layer or the like may be used as heat-shielding function layers to provide a heat-shielding function.

For example, a light-transmissive base material or a hard-coat layer may be colored to form a colored light-transmissive layer. Heat-ray-shielding particles may be dispersed in one or more layers selected from among the light-transmissive base material, the hard-coat layer, and the adhesive layer to form a layer containing the heat-ray-shielding particles. A near-infrared reflective film may also be used as the light-transmissive base material or the like.

A light-transmissive insolation-cutting unit may also include multiple members such as a light-transmissive base material as described above. A light-transmissive insolation-cutting unit may include, for example, a light-transmissive base material and a member other than the light-transmissive base material. As members other than the light-transmissive base material, one or more members selected from among a heat-shielding function layer, a hard-coat layer, an adhesive layer, and the like described above may be listed.

Figure 2:
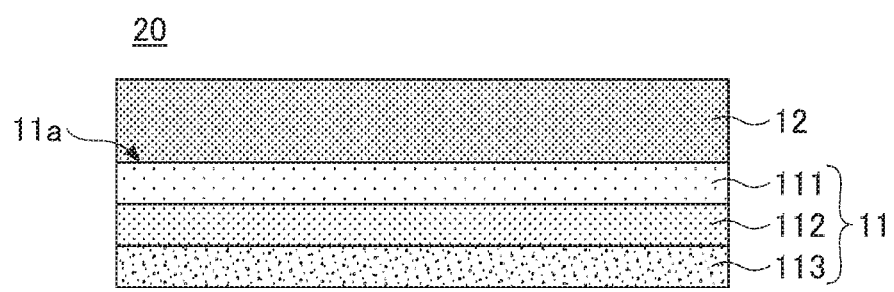
FIG. 2 is a cross-sectional view of a heat-ray-transmission-controllable, light-transmissive base material in another configuration example according to an embodiment of the present invention.

Further, like a heat-ray-transmission-controllable, light-transmissive base material 20 illustrated in FIG. 2, a heat-ray-transmission-controllable, light-transmissive base material of the present embodiment may have a structure in which a light-transmissive insolation-cutting unit 11 includes a hard-coat layer 111, a light-transmissive base material 112, and an adhesive layer 113, in this order starting from the side of a surface 11a facing the transparent conductive oxide layer 12. In this case, one or more layers selected from among the hard-coat layer 111, the light-transmissive base material 112, and the adhesive layer 113 may have a function of controlling transmission of light in at least a part of wavelength regions among wavelength regions of visible light and near-infrared light. In other words, one or more layers selected from among the hard-coat layer 111, the light-transmissive base material 112, and the adhesive layer 113 may also serve as heat-shielding function layers.

Here, "one or more layers selected from among the hard-coat layer 111, the light-transmissive base material 112, and the adhesive layer 113 having a function of controlling transmission of light in at least a part of wavelength regions among wavelength regions of visible light and near-infrared light" may be realized by, for example, a method of coloring one or more of the above-described layers to form colored light-transmissive layers as described above. Also, for example, heat-ray-shielding particles may be dispersed in one or more of the above-described layers to obtain a layer containing the heat-ray-shielding particles or a near-infrared reflective film.

Next, a transparent conductive oxide layer will be described. A transparent conductive oxide layer can function as a heat-insulating function layer having heat-insulating capability.

A transparent conductive oxide layer 12 is a layer containing a transparent conductive oxide, or may also be a layer formed of a transparent conductive oxide. According to the investigations of the inventors of the present invention, far-infrared rays can be reflected by carriers held in a transparent conductive oxide. For this reason, providing a conductive oxide layer enables to make a heat-ray-transmission-controllable, light-transmissive base material of the present embodiment excellent in heat-insulating capability.

A transparent conductive oxide contained in a transparent conductive oxide layer is not limited in particular, and various transparent conductive oxides can be used as long as the material can reflect far-infrared rays. However, as described above, considering carriers to reflect far-infrared rays, a transparent conductive oxide favorably contains, for example, one or more species selected from among an indium oxide doped with one or more species selected from among tin, titanium, tungsten, molybdenum, zinc, and hydrogen; a tin oxide doped with one or more species selected from among antimony, indium, tantalum, chlorine, and fluorine; and a zinc oxide doped with one or more species selected from among indium, aluminum, tin, gallium, fluorine, and boron.

As such a transparent conductive oxide, an indium oxide doped with one or more species selected from among tin, titanium, tungsten, molybdenum, zinc, and hydrogen is more favorable; and an indium oxide doped with one or more species selected from among tin and zinc is even more favorable.

The thickness of a transparent conductive oxide layer is not limited in particular, and can be discretionarily selected depending on required levels of heat-insulating capability and the like. For example, the thickness of a transparent conductive oxide layer is favorably greater than or equal to 30 nm and less than or equal to 500 nm, and more favorably greater than or equal to 50 nm and less than or equal to 400 nm.

This is because setting the thickness of a transparent conductive oxide layer to be greater than or equal to 30 nm enables to reflect far-infrared rays in particular and to improve the heat-insulating capability. This is also because setting the thickness of the transparent conductive oxide layer to be less than or equal to 500 nm enables to maintain sufficiently high visible light transmittance.

The film-forming method of a transparent conductive oxide layer is not limited in particular; for example, a film-forming method using one or more types of dry processes selected from among sputtering, vacuum evaporation, CVD, electron beam evaporation, and the like can be used favorably. In addition, it is favorable to carry out heat treatment after the film formation to increase crystallinity.

A heat-ray-transmission-controllable, light-transmissive base material of the present embodiment is not limited to include only a light-transmissive insolation-cutting unit and a transparent conductive oxide layer as described above, and may further include an optional layer.

Figure 3:
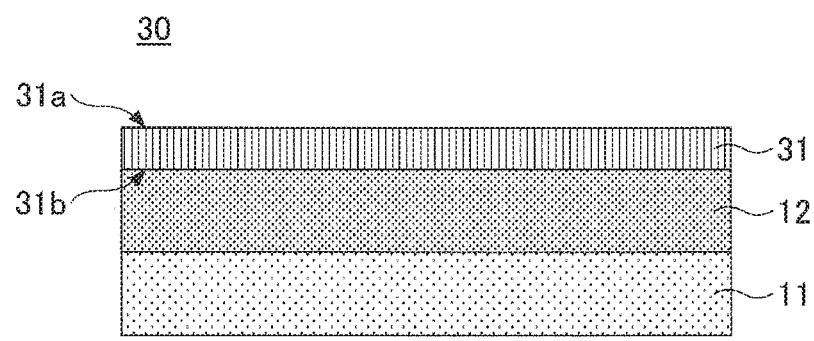
FIG. 3 is a cross-sectional view of a heat-ray-transmission-controllable, light-transmissive base material in yet another configuration example according to an embodiment of the present invention.

A heat-ray-transmission-controllable, light-transmissive base material of the present embodiment may include, in addition to a light-transmissive insolation-cutting unit 11 and a transparent conductive oxide layer 12 as in a heat-ray-transmission-controllable, light-transmissive base material 30 illustrated in FIG. 3, for example, an optical interference layer 31.

Providing an optical interference layer 31 enables to control reflection of visible light so as to improve visibility. Providing an optical interference layer 31 also enables to provide effects of scratch protection and chemical protection for the transparent conductive oxide layer 12.

An optical interference layer 31 favorably has a high visible light transmittance, and in addition, has a small absorption capability of far-infrared rays. This is because having a small absorption capability of far-infrared rays enables to allow most of far-infrared rays in a room transmit through the optical interference layer 31 to reach and to be reflected on the transparent conductive oxide layer 12, and thereby, to increase the heat-insulating capability.

Although not limited in particular, the thickness of an optical interference layer 31 is favorably, for example, greater than or equal to 10 nm and less than or equal to 20 μm. This is because setting the film thickness of an optical interference layer 31 to be less than or equal to 20 μm enables to control the absorption capability of far-infrared rays by the optical interference layer 31 in particular, and to increase the heat-insulating capability. This is also because setting the film thickness of an optical interference layer 31 to be greater than or equal to 10 nm enables to provide sufficient effects of scratch protection and chemical protection.

In the case where an optical interference layer 31 has a refractive index of the optical interference layer, for example, between the refractive index of an air layer and the refractive index of a transparent conductive oxide layer, it is also possible to control reflection of visible light. For this reason, as the material of an optical interference layer 31, it is favorable to use a material having a refractive index, for example, greater than or equal to 1.3 and less than or equal to 1.7.

Furthermore, an optical interference layer 31 having a film thickness in the range described above can cause multiple reflection interference between reflected light on the surface 31a of the optical interference layer 31 and reflected light on the interface 31b of the transparent conductive oxide layer 12, and thereby, can reduce the reflectance of visible light in particular.

In order to reduce the reflectance of visible light, the optical thickness of an optical interference layer 31, namely, the product of the refractive index and the physical thickness is favorably greater than or equal to 50 nm and less than or equal to 150 nm.

If the optical film thickness of an optical interference layer 31 falls within the above range, the anti-reflection effect of the optical interference layer 31 is increased, and in addition, the optical film thickness is smaller than the wavelength range of visible light; therefore, a phenomenon of "iridescence", in which rainbow-like hues appear on the surface of a heat-ray-transmission-controllable, light-transmissive base material, is curbed by multiple reflection interference at the interface, and consequently, the visibility of the heat-ray-transmission-controllable, light-transmissive base material is increased. Note that the refractive index here is a value at a wavelength of 590 nm (wavelength of Na-D line).

In the case of an optical interference layer 31 being a resin layer, the refractive index is generally around 1.3 to 1.7; therefore, from the viewpoint of reducing the reflectance of visible light by setting the optical film thickness within the above range, the thickness of the optical interference layer 31 is favorably greater than or equal to 50 nm and less than or equal to 150 nm.

As the material of an optical interference layer 31, one having high visible light transmittance and being excellent in mechanical strength and chemical strength is favorable. From the viewpoint of increasing the abrasion resistance and the chemical protection effect of a transparent conductive oxide layer, an organic material or inorganic material is favorable. As an organic material, for example, an actinic-ray-curable or thermosetting organic material such as a fluorine-based, acryl-based, urethane-based, ester-based, epoxy-based, silicone-based, or olefin-based material; or an organic-inorganic hybrid material in which an organic component and an inorganic component are chemically bonded, is favorably used.

Also, as an inorganic material, for example, a transparent oxide or the like that contains at least one species selected from among silicon, aluminum, zinc, titanium, zirconium, and tin as the main components; diamond-like carbon; or the like may be listed.

In the case of using an organic material as the optical interference layer 31, it is favorable to introduce a cross-linked structure into the organic material. Forming a cross-linked structure increases the mechanical strength and chemical strength of the optical interference layer, and increases the protective function with respect to a transparent conductive oxide layer and the like. Among such structures, it is favorable to introduce a crosslinked structure derived from an ester compound having an acidic group and a polymerizable functional group in the same molecule.

As an ester compound having an acidic group and a polymerizable functional group in the same molecule, an ester of a compound whose molecule contains a polyacid such as phosphoric acid, sulfuric acid, oxalic acid, succinic acid, phthalic acid, fumaric acid, or maleic acid; a polymerizable functional group such as an ethylenically unsaturated group, silanol group, or epoxy groups; and a hydroxyl group may be listed. Note that although the ester compound may be a polyhydric ester such as a diester or triester, it is favorable that at least one acidic group of a polyacid is not esterified.

In the case of the optical interference layer 31 having a crosslinked structure derived from an ester compound described above, the mechanical strength and chemical strength of the optical interference layer are increased, and the adhesiveness between the optical interference layer 31 and the transparent conductive oxide layer 12 is increased, by which the durability of the transparent conductive oxide layer is particularly increased. Among ester compounds described above, an ester compound of phosphoric acid and an organic acid having a polymerizable functional group (phosphate ester compound) is excellent in adhesiveness to a transparent conductive oxide layer. In particular, an optical interference layer having a crosslinked structure derived from a phosphoric acid ester compound is excellent in adhesiveness to the transparent conductive oxide layer.

From the viewpoint of increasing the mechanical strength and chemical strength of the optical interference layer 31, an ester compound described above favorably contains a (meth) acryloyl group as a polymerizable functional group. Also, from the viewpoint of making the introduction of a crosslinked structure easier, an ester compound described above may have multiple polymerizable functional groups in a molecule. As an ester compound described above, for example, a phosphoric acid monoester compound or phosphoric acid diester compound expressed by the following formula (1) is used favorably. Note that a phosphoric acid monoester and a phosphoric acid diester may also be used together.

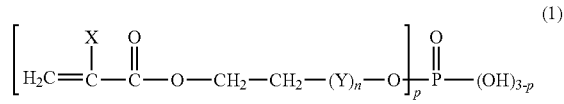

(1)

In the formula, X represents a hydrogen atom or a methyl group, and (Y) represents an —OCO (CH$_2$)$_5$— group. Here, n is 0 or 1 and p is 1 or 2.

The content of the structure derived from an ester compound described above in an optical interference layer 31 is favorably greater than or equal to 1 mass % and less than or equal to 20 mass %, more favorably greater than or equal to 1.5 mass % and less than or equal to 17.5 mass %, even more favorably greater than or equal to 2 mass % and less than or equal to 15 mass %, and particularly favorably greater than or equal to 2.5 mass % and less than or equal to 12.5 mass %. If the content of the ester compound-derived structure is excessively low, the effect of improving the strength and adhesiveness may not be obtained sufficiently. On the other hand, if the content of the ester compound-derived structure is excessively high, the curing rate when forming an optical interference layer decreases to reduce the hardness, or the slipperiness of the optical interference layer surface may be reduced to reduce the abrasion resistance. The content of the structure derived from an ester compound in an optical interference layer can be set in a desired range by adjusting the content of an ester compound described above in a composition when forming the optical interference layer.

The method of forming an optical interference layer 31 is not limited in particular. It is favorable to form an optical interference layer by a method in which, for example, a solution is prepared by dissolving an organic material or a curable monomer or oligomer of an organic material, and an ester compound described above in a solvent; this solution is coated on a transparent conductive oxide layer 12; after the solvent is dried, the coated material is irradiated with ultraviolet rays or electron rays, or energized by heat, to be cured.

Also, in the case of using an inorganic material as the material of an optical interference layer, a film may be formed by one or more types of dry processes selected from among, for example, sputtering, vacuum evaporation, CVD, electron beam evaporation, and the like.

Note that other than organic materials and inorganic materials described above, as materials of an optical interference layer 31, additives including a coupling agent such as a silane coupling agent or titanium coupling agent; a leveling agent; an ultraviolet absorber; an antioxidant; a heat stabilizer; a lubricant; a plasticizer; an anti-coloring agent; a flame retardant; and an anti-static agent, may be included.

Furthermore, an optical interference layer 31 may be constituted with multiple layers of different materials, by laminating an inorganic material and an organic material.

Although characteristics required for a heat-ray-transmission-controllable, light-transmissive base material of the present embodiment are not limited in particular, emissivity measured from the side of a transparent conductive oxide layer is favorably less than or equal to 0.60, more favorably less than or equal to 0.50, and even more favorably less than or equal to 0.40.

This is because setting the emissivity to be less than or equal to 0.60 enables to obtain a heat-ray-transmission-controllable, light-transmissive base material having sufficient heat-insulating capability, which is favorable. Note that although the lower limit value of the emissivity is not limited in particular, since a smaller value is favorable, the emissivity may be set to, for example, 0 or around 0. Therefore, the emissivity may be set, for example, greater than or equal to 0.

As described above, a heat-ray-transmission-controllable, light-transmissive base material of the present embodiment includes a light-transmissive insolation-cutting unit and a transparent conductive oxide layer. Here, the "emissivity measured from the side of the transparent conductive oxide layer" means emissivity measured by having the transparent conductive oxide layer irradiated with infrared rays on a surface among the surfaces of the heat-ray-transmission-controllable, light-transmissive base material, where the surface is on the side closer to the transparent conductive oxide layer among the light-transmissive insolation-cutting unit and the transparent conductive oxide layer.

Also, it is favorable for a heat-ray-transmission-controllable, light-transmissive base material of the embodiment to have a shielding coefficient favorably less than or equal to 0.90, and more favorably less than or equal to 0.60.

The shielding coefficient indicates the ratio of the amount of energy transmission to the unity defined as the energy of sunlight transmitting through a glass having a thickness of 3 mm. Here, a shielding coefficient less than or equal to 0.90 is favorable because this enables the heat-ray-transmission-controllable, light-transmissive base material to have sufficient heat-shielding capability, which is favorable. Note that although the lower limit value of the shielding coefficient is not limited in particular, since a smaller value is favorable, the shielding coefficient may be set to, for example, 0 or around 0. Therefore, the shielding coefficient may be set, for example, greater than or equal to 0.

The shielding coefficient is favorably measured in a situation conforming to actual use conditions. In other words, for example, in the case where a heat-ray-transmission-controllable, light-transmissive base material does not contain a glass plate but contains a light-transmissive resin base material or a colored resin base material, namely, in the case of a heat-ray-transmission-controllable, light-transmissive base material that only includes a resin base material, the heat-ray-transmission-controllable, light-transmissive base material is favorably evaluated in a state of being attached to a glass plate. In this case, although the glass plate is not limited in particular, it is favorable to use a glass plate having a thickness of 3 mm.

In the case where a heat-ray-transmission-controllable, light-transmissive base material includes a glass plate, it is favorable to evaluate the shielding coefficient as it is.

[Light-Transmissive Base Material Unit]

Figure 4:
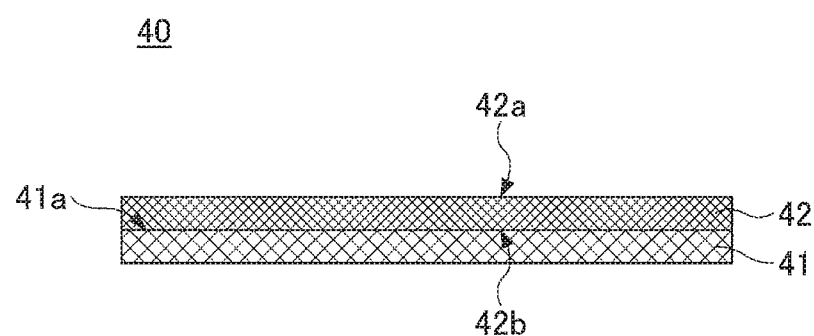
FIG. 4 is a cross-sectional view of a light-transmissive base material unit in one configuration example according to an embodiment of the present invention.

Next, a configuration example of a light-transmissive base material unit of the present embodiment will be described. As illustrated in FIG. 4, a light-transmissive base material unit 40 of the present embodiment includes a light-transmissive base material 41 for windows and a heat-ray-transmission-controllable, light-transmissive base material 42 described above disposed over one surface 41a of the light-transmissive base material 41 for windows.

The light-transmissive base material 41 for windows is, for example, a light-transmissive base material disposed on the daylighting part of a window, and, for example, a glass plate or a light-transmissive resin base material may be used.

A heat-ray-transmission-controllable, light-transmissive base material 42 described above may be disposed on the one surface of the light-transmissive base material 41 for windows. Although the method of fixing the heat-ray-transmission-controllable, light-transmissive base material 42 over the light-transmissive base material 41 for windows is not limited in particular, in the case where the heat-ray-transmission-controllable, light-transmissive base material 42 has an adhesive layer described above, the adhesive layer can be used for the fixation. Also, an adhesive layer or the like may be disposed between the light-transmissive base material 41 for windows and the heat-ray-transmission-controllable, light-transmissive base material 42 for the fixation.

When fixing the heat-ray-transmission-controllable, light-transmissive base material 42 over the light-transmissive base material 41 for windows, it is favorable to carry out the fixation such that the transparent conductive oxide layer is positioned on the side of the interior of a room or vehicle. Further, it is favorable to carry out the fixation such that the light-transmissive insolation-cutting unit is positioned on the side of the exterior of the room or vehicle.

Normally, the heat-ray-transmission-controllable, light-transmissive base material 42 is disposed on the side of a room interior relative to the light-transmissive base material 41 for windows. Therefore, in the example illustrated in FIG. 4, it is favorable to fix the heat-ray-transmission-controllable, light-transmissive base material 42 such that the transparent conductive oxide layer is positioned on the side of the other surface 42a opposite to the one surface 42b facing the light-transmissive base material 41 for windows. Also, it is favorable to carry out the fixation such that the light-transmissive insolation-cutting unit is positioned on the side of the one surface 42b facing the light-transmissive base material 41 for windows, among the sides of the heat-ray-transmission-controllable, light-transmissive base material 42.

This is because, as described above, the light-transmissive insolation-cutting unit has a function of controlling transmission of light in at least a part of wavelength regions among wavelength regions of visible light and near-infrared light; therefore, disposing the light-transmissive insolation-cutting unit to face visible light and near-infrared light from the outside generated by sunlight or the like enables to control incidence of light in at least a part of wavelength regions among wavelength regions of visible light and near-infrared light into the interior of a room or the like. This is also because since the transparent conductive oxide layer has a function of reflecting far-infrared rays, disposing the transparent conductive oxide layer to be oriented toward the interior of a room or the like, enables to control emission of far-infrared rays generated inside the room or the like to the outside.

The shielding coefficient of a light-transmissive base material unit of the present embodiment is favorably less than or equal to 0.90, and more favorably less than or equal to 0.60.

A shielding coefficient of the light-transmissive base material unit of the present embodiment being less than or equal to 0.90 is favorable because this enables the light-transmissive base material unit to have sufficient heat-shielding capability. Note that although the lower limit value of the shielding coefficient is not limited in particular, since a smaller value is favorable, the shielding coefficient may be set to, for example, 0 or around 0. Therefore, the shielding coefficient may be set, for example, greater than or equal to 0.

According to the present embodiment, a light-transmissive base material unit includes a heat-ray-transmission-controllable, light-transmissive base material described above. This enables the light-transmissive base material unit to independently control heat-insulating capability and heat-shielding capability.

EXAMPLES

In the following, specific examples will be described; note that the present invention is not limited to these examples.

(Evaluation Method)
(1) Visible Light Transmittance

A visible light transmittance was determined according to JIS A5759-2008 (films for building window glass) by using a spectrophotometer (product name "U-4100", manufactured by Hitachi High-Technologies Corporation).

(2) Indoor Reflectance

An indoor reflectance was measured as an absolute reflectance.

Specifically, as an indoor reflectance, an absolute reflectance was measured with respect to light incident at an incident angle of 5° from the side of an optical interference layer, and having an emission angle of 5° in a wavelength region of 380 nm to 780 nm.

(3) Emissivity

An emissivity was determined according to JIS R3106-2008 (test method of transmittance, reflectance, emissivity, and solar heat gain coefficient of plate glass), by measuring a positive reflectance obtained when the optical interference layer side was irradiated with infrared rays in a wavelength range of 5 μm to 25 μm by using a Fourier-transform infrared spectrometer (FT-IR) device (manufactured by Varian) equipped with a variable-angle reflection accessory.

(4) Shielding Coefficient

A shielding coefficient was calculated according to JIS A5759-2008 (films for building window glass) method A, by using a spectrophotometer (product name "U-4100", manufactured by Hitachi High-Technologies Corporation) to measure a solar transmittance T. and a solar reflectance $\rho_e$.

(5) Durability

A stainless metal bar 3 mm in diameter was wound with a heat-ray-transmission-controllable, light-transmissive base material having a size of 4 cm by 4 cm such that the surface on the side of the light-transmissive insolation-cutting unit is oriented inward, namely, faces the surface of the metal bar. Then, both ends of the heat-ray-transmission-controllable, light-transmissive base material in a direction parallel to the outer circumferential direction of the metal bar were pinched with a clip, to which a load was applied for 5 seconds with a weight of No. 30 (112.5 g).

The surface on the side of the light-transmissive insolation-cutting unit processed as above was attached to a 3 cm×3 cm glass plate via a 25-μm-thick adhesive layer, to be used as a sample. This sample was immersed in a 5 wt % aqueous sodium chloride solution, and the container containing the sample and the aqueous sodium chloride solution was placed in a dryer at 50° C., to observe changes in emissivity and appearance of the sample after 5 days and after 10 days, which were evaluated according to the following evaluation criteria.

Excellent: no change in appearance after 10 days of immersion, and change in emissivity being less than or equal to 0.02.

Poor: change in appearance observed after 5 days of immersion or after 10 days of immersion, or no change in appearance yet change in emissivity exceeding 0.02.

Note that in Examples 9 and 13, the durability test was not carried out because a glass base material was used, which was not bendable.

Example 1

A heat-ray-transmission-controllable, light-transmissive base material having a configuration shown in Table 1A was produced and evaluated.

Note that in Table 1A and Table 1B, columns under "Configuration of heat-ray-transmission-controllable, light-transmissive base material" specify configurations of heat-ray-transmission-controllable, light-transmissive base materials produced in respective Examples and Comparative Examples. In a light-transmissive insolation-cutting unit, layers are laminated in an order described in a corresponding field under a column of "Configuration of light-transmissive, insolation-cutting unit".

In the column of "Configuration of light-transmissive, insolation-cutting unit" in Tables 1A and 1B, "HC" denotes a hard-coat layer, "multilayer F" denotes a multilayer film, "Heat-absorbing G" denotes a heat-absorbing glass, and "Green G" indicates a green glass.

Also, "PET" denotes a polyethylene terephthalate film, "$TiO_2$" denotes a titanium oxide layer, "Ag" denotes a silver layer, "Ni—Cr" denotes a Ni—Cr layer, "IZO" denotes an IZO film (Indium Zinc Oxide film), "APC" denotes an APC layer (AgPdCu layer), and "$Al_2O_3$" denotes an Al oxide layer, namely, an alumina layer.

Notations of "Heat-shielding HC" and "Heat-shielding adhesive layer" indicate that heat-ray-shielding particles are contained. Also, "Colored PET" denotes a colored polyethylene terephthalate film.

In addition, a heat-ray-transmission-controllable, light-transmissive base material has a structure in which a transparent conductive oxide layer and/or an optical interference layer are further laminated in this order over a layer described at the right end of a corresponding field under the column of "Configuration of light-transmissive, insolation-cutting unit"; in the case of Example 1, over "Heat-shielding HC" (a heat-shielding hard-coat layer).

Also, among members of a heat-ray-transmission-controllable, light-transmissive base material, a member having the heat-insulating function is shown under columns of "Heat-insulating function layer", and a member having a heat-shielding function is shown under columns of "Heat-shielding function layer".

In the present example, as shown in Table 1A, a heat-ray-transmission-controllable, light-transmissive base material was produced that included a light-transmissive insolation-cutting unit having an adhesive layer, a light-transmissive base material (PET), and a hard-coat layer (Heat-shielding HC); and a transparent conductive oxide layer and an optical interference layer over the hard-coat layer.

As the light-transmissive base material, a polyethylene terephthalate (PET) film having a thickness of 50 μm (product name: T602E50, manufactured by Mitsubishi Plastics, Inc.) was used.

A resin solution containing heat-shielding particles (heat-ray-shielding particles) was coated on one surface of the light-transmissive base material by spin coating, dried, and then, cured by ultraviolet (UV) irradiation (300 mJ/cm$^2$) under a nitrogen atmosphere to form a hard-coat layer having a thickness of 2 μm.

The resin solution containing heat-shielding particles was prepared by mixing an optical polymerization initiator (product name: Irgacure 184, manufactured by BASF) to have a resin equivalent of 3 wt %; and a dispersion liquid of cesium tungsten oxide compound particles (product name: YMF-01A, manufactured by Sumitomo Metal Mining Co., Ltd.,) to have a resin equivalent of 15 wt %, into a UV-curable urethane acrylate hard-coat resin solution (product name: ENS 1068, manufactured by DIC Corporation).

An ITO film (indium tin oxide film) was formed as the transparent conductive oxide layer over the hard-coat layer. Specifically, using a complex oxide target having an $SnO_2$ content of 10 wt % with respect to the total amount of $In_2O_3$ and $SnO_2$, a film was formed so as to have a thickness shown in Table 1 by DC magnetron sputtering, to which heat treatment was then applied at 150° C. for 30 minutes to complete the film.

As the sputtering gas, a mixed gas of argon and a small amount of oxygen was used, and the film formation was carried out under a process pressure of 0.2 Pa.

An optical interference layer was formed over the transparent conductive oxide layer. Specifically, a mixed solution was prepared in which an optical polymerization initiator (product name: Irgacure 127, manufactured by BASF) was mixed into an acrylic hard-coat resin solution (product name: Opstar 27535, manufactured by JSR Corporation) to have a resin equivalent of 3 wt %. Then, the mixed solution was coated on the transparent conductive oxide layer by spin coating so as to obtain a thickness shown in Table 1A after drying. After the drying, UV irradiation (300 mJ/cm$^2$) was carried out under a nitrogen atmosphere to cure the coating.

Then, an adhesive layer was formed by coating an acrylic adhesive resin on a surface of the light-transmissive base material opposite to the surface over which the transparent conductive oxide layer and the like were formed so as to have a thickness of 25 μm. The heat-ray-transmission-controllable, light-transmissive base material was obtained by the above steps.

The obtained heat-ray-transmission-controllable, light-transmissive base material was attached to a 3-mm-thick blue glass (manufactured by Matsunami Glass Co., Ltd.) via the adhesive layer to form a light-transmissive base material unit, which was then evaluated as described above. The results are shown in Table 1.

Note that the shown value of emissivity is calculated by deducting a portion of the attached glass plate to form the light-transmissive base material unit. The same applies to the other Examples and Comparative Examples evaluated after formed as light-transmissive base material units.

Examples 2 and 3

A heat-ray-transmission-controllable, light-transmissive base material and a light-transmissive base material unit were produced and evaluated in substantially the same way as in Example 1 except that a transparent conductive oxide layer was formed so as to have a thickness shown in Table 1A. The thickness of the transparent conductive oxide layer is disclosed under one of the columns of "Heat-insulating function layer" in Table 1A.

The results are shown in Table 1A.

Example 4

A heat-ray-transmission-controllable, light-transmissive base material and a light-transmissive base material unit were produced and evaluated in substantially the same way as in Example 1 except that the configurations of the light-transmissive base material and the hard-coat layer were changed as follows.

As the light-transmissive base material, a colored polyethylene terephthalate (PET) film having a thickness of 19 μm and an internal transmittance of 35% (product name: Z735E19, manufactured by Mitsubishi Plastics, Inc.) was used.

Then, a resin solution was coated on one surface of the light-transmissive base material by spin coating, dried, and then, cured by ultraviolet (UV) irradiation (300 mJ/cm$^2$) under a nitrogen atmosphere to form a hard-coat layer having a thickness of 2 μm. In the present example, the hard-coat layer did not contain heat-ray-shielding particles.

The resin solution was prepared by mixing an optical polymerization initiator (product name: Irgacure 184, manufactured by BASF) into a UV-curable urethane acrylate hard-coat resin solution (product name: ENS 1068, manufactured by DIC Corporation) to have a resin equivalent of 3 wt %.

The evaluation results are shown in Table 1A.

Examples 5, 6

A heat-ray-transmission-controllable, light-transmissive base material and a light-transmissive base material unit were produced and evaluated in substantially the same way as in Example 4 except that a transparent conductive oxide layer was formed to have a thickness shown in Table 1A. The results are shown in Table 1A.

Example 7

A heat-ray-transmission-controllable, light-transmissive base material and a light-transmissive base material unit were produced and evaluated in substantially the same way as in Example 1 except that the configurations of the adhesive layer, the hard-coat layer, and the transparent conductive oxide layer were changed as follows.

A resin solution was coated on one surface of the light-transmissive base material by spin coating, dried, and then, cured by ultraviolet (UV) irradiation (300 mJ/cm$^2$) under a nitrogen atmosphere to form a hard-coat layer having a thickness of 2 μm. In the present example, the hard-coat layer did not contain heat-ray-shielding particles.

The resin solution was prepared by mixing an optical polymerization initiator (product name: Irgacure 184, manufactured by BASF) into a UV-curable urethane acrylate hard-coat resin solution (product name: ENS 1068, manufactured by DIC Corporation) to have a resin equivalent of 3 wt %.

A transparent conductive oxide layer was formed in substantially the same way as in Example 1 except for having a thickness of 80 nm.

Then, a resin solution containing heat-shielding particles was coated on a surface of the light-transmissive base material opposite to the surface over which the transparent conductive oxide layer and the like were formed, so as to have a thickness of 25 μm. After the coating, heating was further carried out at 50° C. for 24 hours to form the adhesive layer.

Note that as the resin solution containing heat-shielding particles, an acrylic resin solution was used into which a dispersion liquid of cesium tungsten oxide compound particles (product name: YMF-01A, manufactured by Sumitomo Metal Mining Co., Ltd.) as heat-shielding particles was added to have a resin equivalent of 1.2 wt %, and a crosslinking agent (product name: TETRAD-C, manufactured by Mitsubishi Gas Chemical Co., Ltd.) was further added.

The evaluation results are shown in Table 1A.

Example 8

A heat-ray-transmission-controllable, light-transmissive base material and a light-transmissive base material unit were produced and evaluated in substantially the same way as in Example 1 except that the configurations of the light-transmissive base material, the hard-coat layer, and the transparent conductive oxide layer were changed as follows.

As the light-transmissive base material, instead of the PET film, a multilayer film having a thickness of 50 μm was used, in which polyester films having different refractive indices were laminated to provide a heat-shielding function of reflecting near-infrared rays (product name: nano90S, manufactured by 3M company). Note that a multilayer film is denoted as "Multilayer F" in Table 1A.

A resin solution was coated on one surface of the light-transmissive base material by spin coating, dried, and then, cured by ultraviolet (UV) irradiation (300 mJ/cm$^2$) under a nitrogen atmosphere to form a hard-coat layer having a thickness of 2 μm. In the present example, the hard-coat layer did not contain heat-ray-shielding particles.

The resin solution was prepared by mixing an optical polymerization initiator (product name: Irgacure 184, manufactured by BASF) into a UV-curable urethane acrylate hard-coat resin solution (product name: ENS 1068, manufactured by DIC Corporation) to have a resin equivalent of 3 wt %.

A transparent conductive oxide layer was formed in substantially the same way as in Example 1 except for having a thickness of 80 nm.

The evaluation results are shown in Table 1A.

Example 9

A heat-ray-transmission-controllable, light-transmissive base material was produced in substantially the same way as in Example 1 except that an adhesive layer and a hard-coat layer were not provided, and that the configurations of the light-transmissive base material and the transparent conductive oxide layer were changed.

As the light-transmissive base material, a heat-absorbing glass having a thickness of 6 mm was used that had a heat-shielding function of absorbing near-infrared rays (product name: Greenpane MFL6, manufactured by Nippon Sheet Glass Co., Ltd.). Note that a heat-absorbing glass is denoted as "Heat-absorbing G" in Table 1A.

A transparent conductive oxide layer was formed in substantially the same way as in Example 1 except for having a thickness of 80 nm.

Also, since the light-transmissive base material was a glass plate, evaluation was carried out for the heat-ray-transmission-controllable, light-transmissive base material as it was without being attached to a glass plate The evaluation results are shown in Table 1A.

Example 10

A heat-ray-transmission-controllable, light-transmissive base material and a light-transmissive base material unit were produced and evaluated in substantially the same way as in Example 4 except that as the light-transmissive base material, a colored polyethylene terephthalate (PET) film having a thickness of 19 nm and an internal transmittance of 50% (product name: Z750E19, manufactured by Mitsubishi Plastics, Inc.) was used, and that the transparent conductive oxide layer was formed to have a thickness value shown in Table 1A.

The evaluation results are shown in Table 1A.

Example 11

A heat-ray-transmission-controllable, light-transmissive base material having a configuration shown in Table 1A was produced and evaluated.

As shown in Table 1A, a heat-ray-transmission-controllable, light-transmissive base material was produced that included a light-transmissive insolation-cutting unit having an adhesive layer, a colored light-transmitting layer, an adhesive layer, a light-transmissive base material, and a hard-coat layer; and a transparent conductive oxide layer and an optical interference layer over the hard-coat layer.

As the light-transmissive base material, a polyethylene terephthalate (PET) film having a thickness of 50 μm (product name: T602E50, manufactured by Mitsubishi Plastics, Inc.) was used.

A resin solution was coated on one surface of the light-transmissive base material by spin coating, dried, and then, cured by ultraviolet (UV) irradiation (300 mJ/cm$^2$) under a nitrogen atmosphere to form a hard-coat layer having a thickness of 2 μm.

The resin solution was prepared by mixing an optical polymerization initiator (product name: Irgacure 184, manufactured by BASF) into a UV-curable urethane acrylate hard-coat resin solution (product name: ENS 1068, manufactured by DIC Corporation) to have a resin equivalent of 3 wt %.

An ITO film was formed as a transparent conductive oxide layer over the hard-coat layer. Specifically, using a complex oxide target having an $SnO_2$ content of 10 wt % with respect to the total amount of $In_2O_3$ and $SnO_2$, a film was formed so as to have a thickness shown in Table 1A by DC magnetron sputtering, to which heat treatment was then applied at 150° C. for 30 minutes to complete the film.

Note that as the sputtering gas, a mixed gas of argon and a small amount of oxygen was used, and the film formation was carried out under a process pressure is 0.2 Pa.

An optical interference layer was formed on the transparent conductive oxide layer. Specifically, a mixed solution was prepared in which an optical polymerization initiator (product name: Irgacure 127, manufactured by BASF) was mixed into an acrylic hard-coat resin solution (product name: Opstar 27535, manufactured by JSR Corporation) to have a resin equivalent of 3 wt %. Then, the mixed solution was coated on the transparent conductive oxide layer by spin coating so as to obtain a thickness shown in Table 1A after drying. After the drying, UV irradiation (300 $mJ/cm^2$) was carried out under a nitrogen atmosphere to cure the coating.

Then, an adhesive layer (first adhesive layer) was formed by coating an acrylic adhesive resin on a surface of the light-transmissive base material opposite to the surface over which the transparent conductive oxide layer and the like were formed so as to have a thickness of 25 μm.

Also, a colored light-transmissive layer was disposed on a side of the adhesive layer opposite to the side facing the light-transmissive base material. As a colored light-transmissive layer, a colored polyethylene terephthalate (PET) film having a thickness of 19 μm and an internal transmittance of 15% (product name: Z715E19, manufactured by Mitsubishi Plastics, Inc.) was used.

Then, an adhesive layer (second adhesive layer) was formed on a surface of the colored transparent layer opposite to the surface facing the adhesive layer under the same conditions as the adhesive layer described above.

The heat-ray-transmission-controllable, light-transmissive base material was obtained by the above steps.

The obtained heat-ray-transmission-controllable, light-transmissive base material was attached to a 3-mm-thick blue glass (manufactured by Matsunami Glass Co., Ltd.) via the second adhesive layer to form a light-transmissive base material, which was then evaluated as described above. The results are shown in Table 1A.

Example 12

A heat-ray-transmission-controllable, light-transmissive base material having a configuration shown in Table 1A was produced and evaluated.

As shown in Table 1A, a heat-ray-transmission-controllable, light-transmissive base material was produced that included a light-transmissive insolation-cutting unit having an adhesive layer, a silver layer sandwiched between $TiO_2$ layers ($TiO_2/Ag/TiO_2$), a light-transmissive base material, and a hard-coat layer; and a transparent conductive oxide layer and an optical interference layer over the hard-coat layer.

As the light-transmissive base material, a polyethylene terephthalate (PET) film having a thickness of 50 μm (product name: T602E50, manufactured by Mitsubishi Plastics, Inc.) was used.

An Ag layer sandwiched between $TiO_2$ layers was formed in advance on a surface of the light-transmissive base material opposite to the surface over which a hard-coat layer was to be formed, as will be described later.

A $TiO_2$ layer was formed so as to have a thickness of 15 nm by DC magnetron sputtering using a metal Ti target. As the sputtering gas, a mixed gas of argon/oxygen=85/15 (volume ratio) was used under a process pressure of 0.2 Pa.

The Ag layer was formed on the $TiO_2$ layer described above to have a thickness of 13 nm by DC magnetron sputtering using a metal Ag target. As the sputtering gas, only argon was used under a process pressure of 0.2 Pa.

A $TiO_2$ layer was further formed over the Ag layer in substantially the same way as the $TiO_2$ layer described above, to form the Ag layer sandwiched between the $TiO_2$ layers.

Although Ag is easily corroded, corrosion resistance can be increased by being sandwiched between the $TiO_2$ layers. Also, the Ag layer sandwiched between the $TiO_2$ layers of the present example further had a hard-coat layer and a transparent conductive oxide layer formed over the Ag layer as described below; therefore, the heat-ray-transmission-controllable, light-transmissive base material of the present example did not have a function of reflecting far-infrared rays, but had only a heat-shielding function.

A resin solution was coated on one surface of the light-transmissive base material, which was opposite to the surface over which the Ag layer sandwiched between the $TiO_2$ layer material was provided, by spin coating, dried, and then, cured by ultraviolet (UV) irradiation (300 $mJ/cm^2$) under a nitrogen atmosphere to form a hard-coat layer having a thickness of 2 μm.

The resin solution was prepared by mixing an optical polymerization initiator (product name: Irgacure 184, manufactured by BASF) into a UV-curable urethane acrylate hard-coat resin solution (product name: ENS 1068, manufactured by DIC Corporation) to have a resin equivalent of 3 wt %.

An ITO film was formed as a transparent conductive oxide layer over the hard-coat layer. Specifically, using a complex oxide target having an $SnO_2$ content of 10 wt % with respect to the total amount of $In_2O_3$ and $SnO_2$, a film was formed so as to have a thickness shown in Table 1A by DC magnetron sputtering, to which heat treatment was then applied at 150° C. for 30 minutes to complete the film.

Note that as the sputtering gas, a mixed gas of argon and a small amount of oxygen was used, and the film formation was carried out under a process pressure of 0.2 Pa.

An optical interference layer was formed on the transparent conductive oxide layer. Specifically, a mixed solution was prepared in which an optical polymerization initiator (product name: Irgacure 127, manufactured by BASF) was mixed into an acrylic hard-coat resin solution (product name: Opstar 27535, manufactured by JSR Corporation) to have a resin equivalent of 3 wt %. Then, the mixed solution was coated on the transparent conductive oxide layer by spin coating so as to obtain a thickness shown in Table 1A after drying. After the drying, UV irradiation (300 $mJ/cm^2$) was carried out under a nitrogen atmosphere to cure the coating.

Then, an adhesive layer was formed by coating an acrylic adhesive resin on a surface of the light-transmissive base material opposite to the surface, namely, on the $TiO_2$ layer, over which the transparent conductive oxide layer and the like were formed so as to have a thickness of 25 μm.

The heat-ray-transmission-controllable, light-transmissive base material was obtained by the above steps.

The obtained heat-ray-transmission-controllable, light-transmissive base material was attached to a 3-mm-thick blue glass (manufactured by Matsunami Glass Co., Ltd.) via the adhesive layer to form a light-transmissive base material unit, which was then evaluated as described above. The results are shown in Table 1A.

Example 13

A heat-ray-transmission-controllable, light-transmissive base material and a light-transmissive base material unit were prepared and evaluated in substantially the same way as in Example 9 except that as the light-transmissive base material, a laminated green glass having a thickness of 6 mm+6 mm (product name: Cool verre, manufactured by Asahi Glass Co., Ltd.), which was colored green and had a heat-shielding function of absorbing near-infrared rays.

The evaluation results are shown in Table 1B.

Example 14

A heat-ray-transmission-controllable, light-transmissive base material and a light-transmissive base material unit were produced and evaluated in substantially the same way as in Example 12 except that a Ni—Cr layer was used instead of the Ag layer sandwiched between the $TiO_2$ layers.

A Ni—Cr layer was formed to have a thickness of 4 nm by DC magnetron sputtering using a composite metal target having a Cr content of 20 wt % with respect to the total amount of metal Ni and metal Cr. As the sputtering gas, only argon was used, and the film formation was carried out under a process pressure of 0.2 Pa.

The evaluation results are shown in Table 1B.

Example 15

A heat-ray-transmission-controllable, light-transmissive base material and a light-transmissive base material unit were produced and evaluated in substantially the same way as in Example 2 except that as the optical interference layer, an $SiO_2$ layer was formed instead of the acrylate resin layer.

An $SiO_2$ layer was formed to have a thickness of 110 nm by DC magnetron sputtering using a metal Si target. As the sputtering gas, a mixed gas of argon/oxygen=85/15 (volume ratio) was used, and the film formation was carried out under a process gas pressure of 0.2 Pa.

The evaluation results are shown in Table 1B.

Example 16

In the present example, a heat-ray-transmission-controllable, light-transmissive base material was produced by laminating layers in order from the side of an optical interference layer.

A polypropylene substrate having a thickness of 10 μm was prepared as an optical interference layer.

An ITO film (indium tin oxide film) was formed as the transparent conductive oxide layer on one surface of the optical interference layer. Specifically, using a complex oxide target having an $SnO_2$ content of 10 wt % with respect to the total amount of $In_2O_3$ and $SnO_2$, a film was formed so as to have a thickness shown in Table 1B by DC magnetron sputtering, to which heat treatment was then applied at 150° C. for 30 minutes to complete the film.

As the sputtering gas, a mixed gas of argon and a small amount of oxygen was used, and the film formation was carried out under a process pressure of 0.2 Pa.

Then, a resin solution containing heat-shielding particles (heat-ray-shielding particles) was coated on the transparent conductive oxide layer by spin coating, dried, and then, cured by ultraviolet (UV) irradiation (300 mJ/$cm^2$) under a nitrogen atmosphere to form a hard-coat layer having a thickness of 2 μm.

The resin solution containing heat-shielding particles was prepared by mixing an optical polymerization initiator (product name: Irgacure 184, manufactured by BASF) to have a resin equivalent of 3 wt %; and a dispersion liquid of cesium tungsten oxide compound particles (product name: YMF-01A, manufactured by Sumitomo Metal Mining Co., Ltd.,) to have a resin equivalent of 15 wt %, into a UV-curable urethane acrylate hard-coat resin solution (product name: ENS 1068, manufactured by DIC Corporation).

Next, a light-transmissive base material was attached on the hard-coat layer containing the heat-shielding particles via the adhesive layer.

Also, an adhesive layer was formed on a surface of the light-transmissive base material opposite to the surface facing the hard-coat layer containing the heat-shielding particles.

Each of the adhesive layers was formed by coating an acrylic adhesive resin to have a thickness of 25 μm.

Also, as the light-transmissive base material, a polyethylene-terephthalate (PET) film having a thickness of 50 μm (product name: T602E50, manufactured by Mitsubishi Plastics, Inc.) was used.

The obtained heat-ray-transmission-controllable, light-transmissive base material was attached to a 3-mm-thick blue glass (manufactured by Matsunami Glass Co., Ltd.) via the adhesive layer to form a light-transmissive base material unit, which was then evaluated as described above. The results are shown in Table 1B.

Example 17

A heat-ray-transmission-controllable, light-transmissive base material and a light-transmissive base material unit were manufactured and evaluated in substantially the same way as in Example 1 except that as the transparent conductive oxide layer, instead of the ITO film, an IZO film (Indium Zinc Oxide film) was formed to have a thickness of 400 nm.

The IZO film was formed to have a thickness of 400 nm by DC magnetron sputtering using a composite oxide target having a ZnO content of 10 wt % with respect to the total amount of $In_2O_3$ and ZnO.

As the sputtering gas, a mixed gas of argon and a small amount of oxygen was used, and the film formation was carried out under a process pressure of 0.2 Pa.

The evaluation results are shown in Table 1B.

Example 18

A heat-ray-transmission-controllable, light-transmissive base material and a light-transmissive base material unit were produced and evaluated in substantially the same way as in Example 1 except that an ITO film as the transparent conductive oxide layer was formed to have a thickness of 30 nm.

The evaluation results are shown in Table 1B.

Example 19

A heat-ray-transmission-controllable, light-transmissive base material and a light-transmissive base material unit were produced and evaluated in substantially the same way as in Example 2 except that the following layers were formed between the heat-shielding hard-coat layer and the transparent conductive oxide layer.

As an adhesion improving layer as an underlayer, an Al oxide layer, namely, an alumina layer (denoted as "$Al_2O_3$" in Table 1B) was formed over the hard-coat layer containing the heat-shielding particles. Specifically, the alumina layer was formed to have a thickness of 3 nm by DC magnetron sputtering using a metal Al target.

As the sputtering gas, a mixed gas of argon/oxygen=85/15 (volume ratio) was used, and the film formation was carried out under a process gas pressure of 0.2 Pa.

The evaluation results are shown in Table 1B.

Comparative Example 1

A heat-ray-transmission-controllable, light-transmissive base material having a configuration shown in Table 1B was produced and evaluated.

As shown in Table 1B, a heat-ray-transmission-controllable, light-transmissive base material was produced to include a light-transmissive insolation-cutting unit having a light-transmissive base material, a hard-coat layer, and an APC layer (AgPdCu layer) sandwiched between IZO films; and an optical interference layer over the APC layer sandwiched between the IZO films.

As the light-transmissive base material, a polyethylene terephthalate (PET) film having a thickness of 50 μm (product name: T602E50, manufactured by Mitsubishi Plastics, Inc.) was used.

A resin solution was coated on one surface of the light-transmissive base material by spin coating, dried, and then, cured by ultraviolet (UV) irradiation (300 mJ/cm$^2$) under a nitrogen atmosphere to form a hard-coat layer having a thickness of 2 μm.

The resin solution was prepared by mixing an optical polymerization initiator (product name: Irgacure 184, manufactured by BASF) into a UV-curable urethane acrylate hard-coat resin solution (product name: ENS 1068, manufactured by DIC Corporation) to have a resin equivalent of 3 wt %.

An APC layer (AgPdCu layer) sandwiched between IZO films was formed on the hard-coat layer. The APC layer serves both as a heat-shielding function layer and as a heat-insulating function layer.

First, over the hard-coat layer, by using DC magnetron sputtering, a 30 nm-thick first metal oxide layer made of an indium-zinc complex oxide (IZO), a 5 nm-thick metal layer made of an Ag—Pd—Cu alloy, and a 30 nm-thick second metal oxide layer made of IZO were formed one by one.

The first metal oxide layer and the second metal oxide layer were formed by DC magnetron sputtering using a composite oxide target having a ZnO content of 10 wt % with respect to the total amount of $In_2O_3$ and ZnO. As the sputtering gas, a mixed gas of argon and a small amount of oxygen was used, and the film formation was carried out under a process pressure pressure of 0.2 Pa.

The APC layer was formed by DC magnetron sputtering using an alloy target in which the content ratio of Ag, Pd, and Cu was 99.0:0.6:0.4 (weight ratio). As the sputtering gas, only an argon gas was used, and the film formation was carried out under a process pressure of 0.2 Pa.

An optical interference layer was formed over the APC layer sandwiched between the IZO films. Specifically, a mixed solution was prepared in which an optical polymerization initiator (product name: Irgacure 127, manufactured by BASF) was mixed into an acrylic hard-coat resin solution (product name: Opstar 27535, manufactured by JSR Corporation) to have a resin equivalent of 3 wt %. Then, the mixed solution was coated on the transparent conductive oxide layer by spin coating so as to obtain a thickness shown in Table 1B after drying. After the drying, UV irradiation (300 mJ/cm$^2$) was carried out under a nitrogen atmosphere to cure the coating.

Then, an adhesive layer was formed by coating an acrylic adhesive resin on a surface of the light-transmissive base material opposite to the surface over which the APC layer sandwiched between the IZO films and the like were formed, so as to have a thickness of 25 μm.

The heat-ray-transmission-controllable, light-transmissive base material was obtained by the above steps.

The obtained heat-ray-transmission-controllable, light-transmissive base material was attached to a 3-mm-thick blue glass (manufactured by Matsunami Glass Co., Ltd.) via the adhesive layer to form a light-transmissive base material unit, which was then evaluated as described above. The results are shown in Table 1B.

Comparative Examples 2 and 3

A heat-ray-transmission-controllable, light-transmissive base material and a light-transmissive base material unit were produced and evaluated in substantially the same way as in Comparative Example 1 except that the APC layer was formed to have a thickness shown in Table 1B. The results are shown in Table 1B.

Comparative Example 4

A heat-ray-transmission-controllable, light-transmissive base material and a light-transmissive base material unit were produced and evaluated in substantially the same way as in Comparative Example 3 except that as the light-transmissive base material, a colored polyethylene terephthalate (PET) film having a thickness of 19 μm and an internal transmittance of 50% (product name: Z750E19, manufactured by Mitsubishi Plastics, Inc.) was used. The results are shown in Table 1B.

Comparative Example 5

A heat-ray-transmission-controllable, light-transmissive base material and a light-transmissive base material unit were produced and evaluated in substantially the same way as in Example 2 except that a hard-coat layer was not provided. Note that there was no heat-shielding function layer.

The results are shown in Table 1B.

TABLE 1A

| | Configuration of heat-ray-transmission-controllable, light-transmissive base material | | | | Heat-insulating function layer | |
|---|---|---|---|---|---|---|
| | Configuration of light-transmissive, insolation-cutting unit | Transparent conductive oxide layer | Optical interference layer | | | |
| | | | Material | Thickness (nm) | Material | Thickness (nm) |
| Ex. 1 | Adhesive layer/PET/Heat-shielding HC | ITO | Acrylate | 100 | ITO | 40 |
| Ex. 2 | Adhesive layer/PET/Heat-shielding HC | ITO | Acrylate | 100 | ITO | 80 |
| Ex. 3 | Adhesive layer/PET/Heat-shielding HC | ITO | Acrylate | 100 | ITO | 150 |
| Ex. 4 | Adhesive layer/Colored PET(T: 35%)/HC | ITO | Acrylate | 100 | ITO | 40 |
| Ex. 5 | Adhesive layer/Colored PET(T: 35%)/HC | ITO | Acrylate | 100 | ITO | 80 |
| Ex. 6 | Adhesive layer/Colored PET(T: 35%)/HC | ITO | Acrylate | 100 | ITO | 150 |
| Ex. 7 | Heat-shielding adhesive layer/PET/HC | ITO | Acrylate | 100 | ITO | 80 |
| Ex. 8 | Adhesive layer/Multilayer F/HC | ITO | Acrylate | 100 | ITO | 80 |
| Ex. 9 | Heat-absorbing G | ITO | Acrylate | 100 | ITO | 80 |
| Ex. 10 | Adhesive layer/Colored PET(T: 50%)/HC | ITO | Acrylate | 100 | ITO | 150 |
| Ex. 11 | Adhesive layer/Colored PET(T: 15%)/Adhesive layer/PET/HC | ITO | Acrylate | 100 | ITO | 80 |
| Ex. 12 | Adhesive layer/$TiO_2$/Ag/$TiO_2$/PET/HC | ITO | Acrylate | 100 | ITO | 80 |

| | Heat-shielding function layer | | Optical characteristics | | | | |
|---|---|---|---|---|---|---|---|
| | Corresponding layer | Thickness | Visible light transmittance (%) | Indoor reflectance (%) | Emissivity | Shielding coefficient | Durability |
| Ex. 1 | Heat-shielding HC | 2 μm | 88 | 6 | 0.45 | 0.83 | Excellent |
| Ex. 2 | Heat-shielding HC | 2 μm | 88 | 6 | 0.30 | 0.82 | Excellent |
| Ex. 3 | Heat-shielding HC | 2 μm | 88 | 6 | 0.10 | 0.80 | Excellent |
| Ex. 4 | Colored PET | 19 μm | 37 | 2 | 0.45 | 0.72 | Excellent |
| Ex. 5 | Colored PET | 19 μm | 37 | 2 | 0.30 | 0.71 | Excellent |
| Ex. 6 | Colored PET | 19 μm | 37 | 2 | 0.10 | 0.70 | Excellent |
| Ex. 7 | Heat-shielding adhesive layer | 25 μm | 88 | 6 | 0.30 | 0.82 | Excellent |
| Ex. 8 | Multilayer F | 50 μm | 90 | 6 | 0.30 | 0.80 | Excellent |
| Ex. 9 | Heat-absorbing G | 6 mm | 78 | 8 | 0.30 | 0.70 | — |
| Ex. 10 | Colored PET | 19 μm | 53 | 6 | 0.10 | 0.78 | Excellent |
| Ex. 11 | Colored PET | 19 μm | 17 | 1 | 0.30 | 0.60 | Excellent |
| Ex. 12 | Silver layer | 13 nm | 65 | 20 | 0.30 | 0.60 | Excellent |

TABLE 1B

| | Configuration of heat-ray-transmission-controllable, light-transmissive base material | | | | Heat-insulating function layer | |
|---|---|---|---|---|---|---|
| | Configuration of light-transmissive, insolation-cutting unit | Transparent conductive oxide layer | Optical interference layer | | | |
| | | | Material | Thickness (nm) | Material | Thickness (nm) |
| Ex. 13 | Green G | ITO | Acrylate | 100 | ITO | 80 |
| Ex. 14 | Adhesive layer/Ni—Cr/PET/HC | ITO | Acrylate | 100 | ITO | 80 |
| Ex. 15 | Adhesive layer/PET/Heat-shielding HC | ITO | $SiO_2$ | 110 | ITO | 80 |
| Ex. 16 | Adhesive layer/PET/Adhesive layer/Heat-shielding HC | ITO | PP | 10000 (10 μm) | ITO | 80 |

TABLE 1B-continued

| | | | | | | | |
|---|---|---|---|---|---|---|---|
| Ex. 17 | Adhesive layer/PET/Heat-shielding HC | IZO | | Acrylate | 100 | IZO | 400 |
| Ex. 18 | Adhesive layer/PET/Heat-shielding HC | ITO | | Acrylate | 100 | ITO | 30 |
| Ex. 19 | Adhesive layer/PET/Heat-shielding/HC/$Al_2O_3$ | ITO | | Acrylate | 100 | ITO | 80 |
| Comp. ex. 1 | Adhesive layer/PET/HC/IZO/APC/IZO | — | | Acrylate | 100 | APC | 5 |
| Comp. ex. 2 | Adhesive layer/PET/HC/IZO/APC/IZO | — | | Acrylate | 100 | APC | 10 |
| Comp. ex. 3 | Adhesive layer/PET/HC/IZO/APC/IZO | — | | Acrylate | 100 | APC | 16 |
| Comp. ex. 4 | Adhesive layer/Colored PET(T: 50%)/HC/IZO/APC/IZO | — | | Acrylate | 100 | APC | 16 |
| Comp. ex. 5 | Adhesive layer/PET | ITO | | Acrylate | 100 | ITO | 80 |

| | Heat-shielding function layer | | Optical characteristics | | | | |
|---|---|---|---|---|---|---|---|
| | Corresponding layer | Thickness | Visible light transmittance (%) | Indoor reflectance (%) | Emissivity | Shielding coefficient | Durability |
| Ex. 13 | Green G | 12 mm | 80 | 6 | 0.30 | 0.72 | — |
| Ex. 14 | Ni—Cr | 4 nm | 30 | 30 | 0.30 | 0.49 | Excellent |
| Ex. 15 | Heat-shielding HC | 2 μm | 88 | 6 | 0.30 | 0.82 | Excellent |
| Ex. 16 | Heat-shielding HC | 2 μm | 82 | 10 | 0.35 | 0.82 | Excellent |
| Ex. 17 | Heat-shielding HC | 2 μm | 85 | 8 | 0.28 | 0.82 | Excellent |
| Ex. 18 | Heat-shielding HC | 2 μm | 88 | 6 | 0.55 | 0.86 | Excellent |
| Ex. 19 | Heat-shielding HC | 2 μm | 88 | 6 | 0.30 | 0.82 | Excellent |
| Comp. ex. 1 | APC | 5 nm | 75 | 6 | 0.35 | 0.80 | Poor |
| Comp. ex. 2 | APC | 10 nm | 80 | 8 | 0.14 | 0.70 | Poor |
| Comp. ex. 3 | APC | 16 nm | 70 | 15 | 0.09 | 0.60 | Poor |
| Comp. ex. 4 | Colored PET, APC | 19 μm, 16 nm | 40 | 15 | 0.09 | 0.50 | Poor |
| Comp. ex. 5 | — | | 92 | 4 | 0.30 | 0.30 | Excellent |

Tables 2 to 4 show the results of Examples 1 to 3, the results of Examples 4 to 6, and the results of Comparative Examples 1 to 3, respectively, where the examples in each table differ from each other only in the thickness of the transparent conductive oxide layer as the heat-insulating function layer.

TABLE 2

| | | Ex. 1 | Ex. 2 | Ex. 3 |
|---|---|---|---|---|
| Heat-insulating function layer | Material | ITO | ITO | ITO |
| | Thickness (nm) | 40 | 80 | 150 |
| Heat-shielding function layer | | Heat-shielding HC | Heat-shielding HC | Heat-shielding HC |
| Emissivity | | 0.45 | 0.30 | 0.10 |
| Visible light transmittance (%) | | 88 | 88 | 88 |
| Shielding coefficient | | 0.83 | 0.82 | 0.80 |

TABLE 3

| | | Ex. 4 | Ex. 5 | Ex. 6 |
|---|---|---|---|---|
| Heat-insulating function layer | Material | ITO | ITO | ITO |
| | Thickness (nm) | 40 | 80 | 150 |
| Heat-shielding function layer | | Colored PET | Colored PET | Colored PET |
| Emissivity | | 0.45 | 0.30 | 0.10 |
| Visible light transmittance (%) | | 37 | 37 | 37 |
| Shielding coefficient | | 0.72 | 0.71 | 0.70 |

TABLE 4

| | | Comp. ex. 1 | Comp. ex. 2 | Comp. ex. 3 |
|---|---|---|---|---|
| Heat-insulating function layer | Material | APC | APC | APC |
| | Thickness (nm) | 5 | 10 | 16 |
| Heat-shielding function layer | | APC | APC | APC |
| Emissivity | | 0.35 | 0.14 | 0.09 |
| Visible light transmittance (%) | | 75 | 80 | 70 |
| Shielding coefficient | | 0.80 | 0.70 | 0.60 |

From the results in Table 2 and Table 3, in Examples 1 to 6, by changing the thickness of the transparent conductive oxide layer functioning as the heat-insulating function layer, it has been confirmed that only the emissivity as an index of heat-insulating capability varies considerably, and the shielding coefficient as an index of heat-shielding capability hardly changes. In other words, it has been confirmed that the heat-insulating capability and the heat-shielding capability can be controlled independently.

Meanwhile, in Comparative Examples 1 to 3 shown in Table 4, changing the thickness of the APC layer, which also functions as a heat-insulating function layer, causes considerable changes not only in the emissivity but also in the shielding coefficient as an index of the heat-shielding capability. Thus, it has been confirmed that the heat-insulating capability and the heat-shielding capability cannot be controlled independently.

From the above results, it has been confirmed that a heat-ray-transmission-controllable, light-transmissive base material that includes a light-transmissive insolation-cutting unit and a transparent conductive oxide layer enables to independently control the heat-insulating capability and the heat-shielding capability.

Further, from the results of Example 7 to Example 19, it has been confirmed that an adhesive layer, a light-transmissive base material, and a hard-coat layer can also be used as a heat-shielding function layer, and that other than the adhesive layer, a colored transmissive layer, a near-infrared reflective layer, a visible-light-transmission controlling layer, or the like may be provided to function as a heat-shielding functional layer.

Further, in Comparative Examples 1 to 4 each of which has an APC layer as a silver alloy layer disposed on the surface side, cracks and the like were generated in the APC layer and the ceramic layer to make the durability poor, whereas in Examples 1 to 19 none of which used a silver alloy layer on the surface side, it has been confirmed that the durability was excellent.

This is because cracks were generated in the silver alloy layer and the ceramic layer by bending, the corrosive silver alloy layer was exposed, and deterioration started from the cracked portions.

As above, heat-ray-transmission-controllable, light-transmissive base materials and light-transmissive base material units have been described above according to the embodiments, examples, and the like. Note that the present embodiment is not limited to the embodiments and examples described above. Various modifications and changes can be made within the scope of the invention as described in the claims.

This application claims priorities based on Japanese Patent Application No. 2017-073026 filed with the Japanese Patent Office on Mar. 31, 2017, and Japanese Patent Application No. 2018-049517 filed with the Japanese Patent Office on Mar. 16, 2018; and the entire contents of Japanese Patent Application No. 2017-073026 and Japanese Patent Application No. 2018-049517 are incorporated herein by reference.

LIST OF REFERENCE CODES 10, 20, 30, 42 heat-ray-transmission-controllable, light-transmissive base material
11 light-transmissive insolation-cutting unit
111 hard-coat layer
112 light-transmissive base material
113 adhesive layer
12 transparent conductive oxide layer
31 optical interference layer
40 light-transmissive base material unit
41 light-transmissive base material for windows

The invention claimed is:

1. A heat-ray-transmission-controllable, light-transmissive base material comprising:
    a light-transmissive insolation-cutting unit configured to control transmission of light in at least a part of wavelength regions among wavelength regions of visible light and near-infrared light;
    a transparent conductive oxide layer disposed over the light-transmissive insolation-cutting unit; and
    an optical interference layer over the transparent conductive oxide layer,
    wherein the transparent conductive oxide layer comprises a transparent conductive oxide, and
    wherein an optical thickness of the optical interference layer, which is a product of a refractive index and a physical thickness, is greater than or equal to 50 nm and less than or equal to 150 nm.

2. The heat-ray-transmission-controllable, light-transmissive base material as claimed in claim 1, wherein a thickness of the transparent conductive oxide layer is greater than or equal to 30 nm and less than or equal to 500 nm.

3. The heat-ray-transmission-controllable, light-transmissive base material as claimed in claim 1, wherein the transparent conductive oxide layer comprises, as the transparent conductive oxide, one or more species selected from among
    an indium oxide doped with one or more species selected from among tin, titanium, tungsten, molybdenum, zinc, and hydrogen;
    a tin oxide doped with one or more species selected from among antimony, indium, tantalum, chlorine, and fluorine; and
    a zinc oxide doped with one or more species selected from among indium, aluminum, tin, gallium, fluorine, and boron.

4. The heat-ray-transmission-controllable, light-transmissive base material as claimed in claim 1, wherein the light-transmissive insolation-cutting unit includes a light-transmissive base material and a member other than the light-transmissive base material.

5. The heat-ray-transmission-controllable, light-transmissive base material as claimed in claim 1, wherein the light-transmissive insolation-cutting unit includes, in order from a side facing the transparent conductive oxide layer, a hard-coat layer, a light-transmissive base material, and an adhesive layer; and
    wherein one or more layers selected from among the hard-coat layer, the light-transmissive base material, and the adhesive layer have a function of controlling transmission of light in at least a part of wavelength regions among the wavelength regions of visible light and near-infrared light.

6. The heat-ray-transmission-controllable, light-transmissive base material as claimed in claim 1, wherein an emissivity measured from a side of the transparent conductive oxide layer is less than or equal to 0.60.

7. A light-transmissive base material unit comprising:
    a light-transmissive base material for a window; and
    the heat-ray-transmission-controllable, light-transmissive base material as claimed in claim 1, disposed on one surface of the light-transmissive base material for the window.

8. The light-transmissive base material unit as claimed in claim 7, wherein a shielding coefficient is less than or equal to 0.90.

\* \* \* \* \*